US010637386B2

(12) United States Patent
Li et al.

(10) Patent No.: US 10,637,386 B2
(45) Date of Patent: Apr. 28, 2020

(54) TORQUE RIPPLE REDUCTION IN SWITCHED RELUCTANCE MACHINE

(71) Applicant: Enedym Inc., Hamilton (CA)

(72) Inventors: Haoding Li, Hamilton (CA); Berker Bilgin, Hamilton (CA); Ali Emadi, Burlington (CA)

(73) Assignee: Enedym Inc., Hamilton (CA)

( * ) Notice: Subject to any disclaimer, the term of this patent is extended or adjusted under 35 U.S.C. 154(b) by 0 days.

(21) Appl. No.: 16/045,959

(22) Filed: Jul. 26, 2018

(65) Prior Publication Data

US 2020/0036314 A1 Jan. 30, 2020

(51) Int. Cl.
*H02P 25/098* (2016.01)

(52) U.S. Cl.
CPC .................... *H02P 25/098* (2016.02)

(58) Field of Classification Search
CPC ....... H01H 36/00; H02P 25/08; H02P 25/098; H02P 6/10; H02P 6/28
See application file for complete search history.

(56) References Cited

U.S. PATENT DOCUMENTS

| | | | | |
|---|---|---|---|---|
| 4,088,934 A * | 5/1978 | D'Atre | ............... | B60L 15/025 318/802 |
| 5,111,096 A * | 5/1992 | Horst | ............... | H02K 1/24 310/168 |
| 5,420,492 A * | 5/1995 | Sood | ............... | H02P 6/08 318/809 |
| 5,545,938 A * | 8/1996 | Mecrow | ............... | H02K 3/18 310/156.64 |
| 5,703,456 A * | 12/1997 | Cox | ............... | H02M 3/158 318/400.17 |
| 5,838,087 A * | 11/1998 | Tang | ............... | H02K 19/103 310/168 |
| 6,404,152 B1 * | 6/2002 | Kobayashi | ............... | H02P 6/10 318/400.23 |
| 8,344,669 B1 * | 1/2013 | Gadda | ............... | H02P 25/22 318/135 |
| 9,742,320 B2 * | 8/2017 | Ye | ............... | H02P 25/098 |
| 2010/0123426 A1 * | 5/2010 | Nashiki | ............... | H02K 1/12 318/701 |

* cited by examiner

*Primary Examiner* — Thai T Dinh
(74) *Attorney, Agent, or Firm* — Bereskin & Parr LLP/S.E.N.C.R.L., s.r.l.

(57) ABSTRACT

Various embodiments are described herein for methods and systems for controlling a switched reluctance machine (SRM) having an axially extending rotor mounted to a shaft, an axially extending stator disposed coaxially and concentrically with the rotor, the rotor and stator having a plurality of salient poles, the stator poles protruding radially towards the rotor poles, and a plurality of electrical coils wound about the stator poles including a plurality of separate phase coils defining a plurality of phases of the SRM. In one example embodiment, the method comprises providing a control system operatively coupled to a current controller of the SRM, where the control system is configured to generate a unique set of current reference profiles based on an objective function and at least one constraint function and operating the SRM based on the unique set of current profiles generated by the control system.

20 Claims, 18 Drawing Sheets

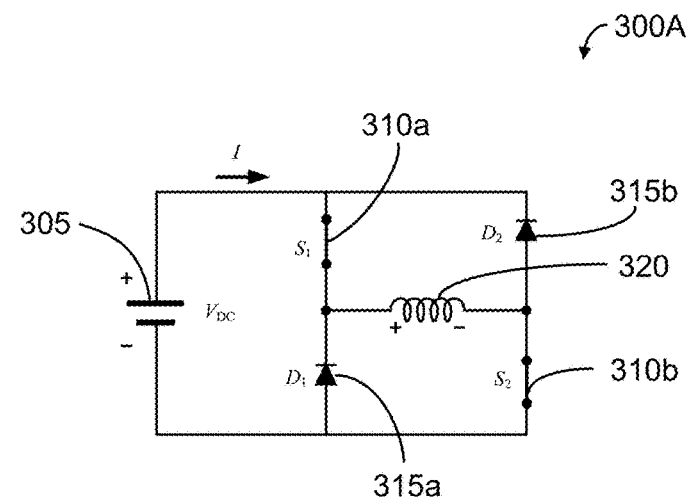
FIG. 3A
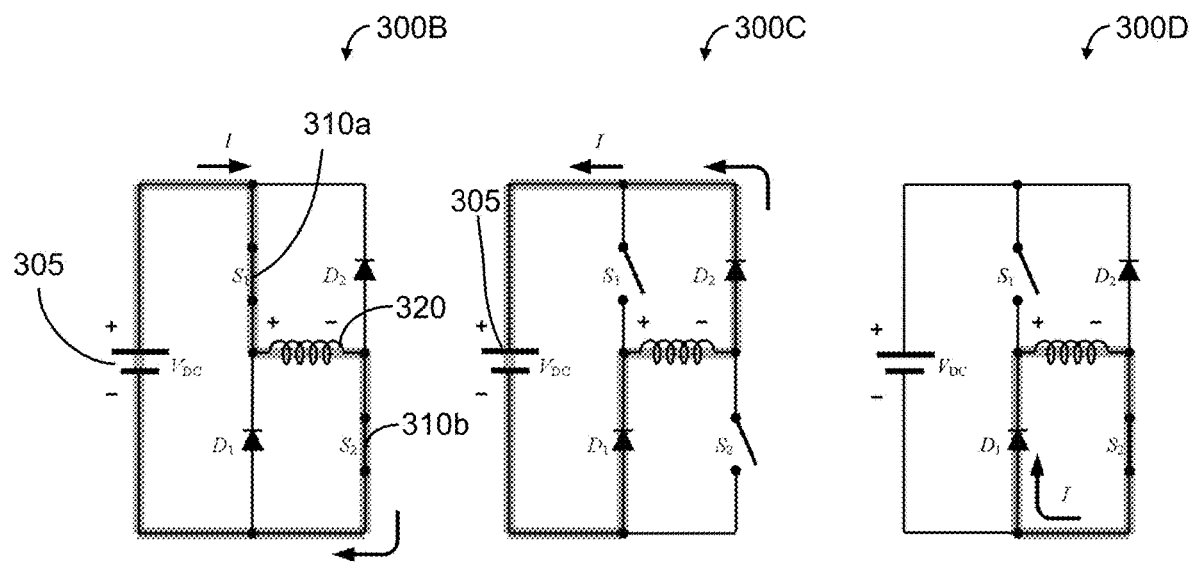
FIG. 3B  FIG. 3C  FIG. 3D

TORQUE RIPPLE REDUCTION IN SWITCHED RELUCTANCE MACHINE

FIELD OF THE INVENTION

The described embodiments relate generally to switched reluctance machines, and in particular, to torque sharing functions (TSFs) for torque ripple reduction in switched reluctance machines (SRMs).

BACKGROUND

Electric machines have been applied as motors and generators in a wide range of industries for more than a century. A reluctance machine is an electric machine in which torque is produced by the tendency of the movable part of the machine to move into a position where the inductance of an excited winding is maximized. A switched reluctance machine (SRM) is a type of a reluctance machine where the windings are energized as a function of the position of the movable part of the machine.

SRMs are suitable for traction and automotive applications due to their simple and low-cost construction and robustness. However, some SRMs may have drawbacks including high electromagnetic torque ripple and/or high acoustic noise. The high torque ripple typically results from poor tracking precision of phase current, nonlinear inductance profiles and non-linear torque-current-rotor position characteristics.

SUMMARY

In one aspect of the disclosure, in at least one embodiment described herein, there is provided a switched reluctance machine comprising: an axially extending shaft, an axially extending rotor mounted to the shaft, where the rotor has a plurality of salient rotor poles, an axially extending stator disposed coaxially and concentrically with the rotor, where the stator has a plurality of salient stator poles protruding radially from the stator towards the rotor poles, a plurality of electrical coils wound about the stator poles, where the plurality of electrical coils including a plurality of separate phase coils defining a plurality of phases of the switched reluctance machine, and a control system operatively coupled to a current controller for the switched reluctance machine, the control system being configured to generate a unique set of current reference profiles based on an objective function and at least one constraint function, wherein the control system is configured to provide the unique set of current reference profiles to the current controller for controlling the switched reluctance machine.

In some embodiments, the control system is configured to receive a predetermined value of a weight parameter, σ.

In some embodiments, the objective function, J, comprises:

$$J = i_k^2 + \sigma i_{k-1}^2,$$

where, $i_{k-1}$ represents a reference current for an outgoing phase at a present rotor position of the switched reluctance machine, $i_k$ represents a reference current for an incoming phase at the present rotor position of the switched reluctance machine, and σ represents a predetermined value of a weight parameter.

In some embodiments, the at least one constraint function comprises:

$$0 \leq i_k \leq i_{rated}$$

$$0 \leq i_{k-1} \leq i_{rated},$$

where, $i_{k-1}$ represents a reference current for an outgoing phase at a present rotor position of the switched reluctance machine, $i_k$ represents a reference current for an incoming phase at the present rotor position of the switched reluctance machine, and $i_{rated}$ represents an allowable peak current for the switched reluctance machine.

In some embodiments, the at least one constraint function comprises:

$$T_{ref} = T(i_k, \theta_k) + T(i_{k-1}, \theta_{k-1}),$$

where, $T_{ref}$ represents a reference torque for the switched reluctance machine, $T(i_{k-1}, \theta_{k-1})$ represents a phase torque for the switched reluctance machine in the outgoing phase, and $T(i_k, \theta_k)$ represents a phase torque of the switched reluctance machine in the incoming phase.

In some embodiments, the at least one constraint function comprises:

$$\frac{\Delta\lambda(i_k, \theta_k)}{\Delta t} \leq V_{DC} - i_k R$$

$$\frac{\Delta\lambda(i_k, \theta_k)}{\Delta t} \geq -V_{DC} + i_k R$$

$$\frac{\Delta\lambda(i_{k-1}, \theta_{k-1})}{\Delta t} \leq V_{DC} - i_{k-1} R$$

$$\frac{\Delta\lambda(i_{k-1}, \theta_{k-1})}{\Delta t} \geq -V_{DC} + i_{k-1} R$$

where, $V_{DC}$ represents a dc-link voltage supplied to the switched reluctance machine, R represents a phase resistance, λ represents a phase flux linkage, Δt represents the sampling period, $i_{k-1}$ represents a reference current for an outgoing phase of the switched reluctance machine, $i_k$ represents a reference current for an incoming phase of the switched reluctance machine, $\theta_{k-1}$ represents a rotor position for the outgoing phase of the switched reluctance machine, and $\theta_k$ represents a rotor position for the incoming phase of the switched reluctance machine.

In some embodiments, the control system is configured to generate the unique set of current reference profiles over a span of one electrical period.

In some embodiments, the control system is configured to store the unique set of current reference profiles as a function of position of the rotor over the span of one electrical period.

In another aspect, in at least one embodiment described herein, there is provided a method of controlling a switched reluctance machine, the method comprising: providing the switched reluctance machine, where the switched reluctance machine comprises an axially extending shaft, an axially extending rotor mounted to the shaft, the rotor having a plurality of salient rotor poles, an axially extending stator disposed coaxially and concentrically with the rotor, the stator having a plurality of salient stator poles protruding radially from the stator towards the rotor poles, and a plurality of electrical coils wound about the stator poles, the plurality of electrical coils including a plurality of separate phase coils defining a plurality of phases of the switched reluctance machine. The method further comprises providing a control system operatively coupled to a current controller for the switched reluctance machine, where the control system is configured to generate a unique set of current reference profiles based on an objective function and at least one constraint function, and operating the switched reluctance machine based on the unique set of current profiles generated by the control system.

In some embodiments, the method comprises receiving a predetermined value of a weight parameter, σ, by the control system to generate the objective function.

In some embodiments, the method comprises generating, by the control system, the objective function based on:

$$J = i_k^2 + \sigma i_{k-1}^2,$$

where, $i_{k-1}$ represents a reference current for an outgoing phase at a present rotor position of the switched reluctance machine, $i_k$ represents a reference current for an incoming phase at the present rotor position of the switched reluctance machine, and σ represents a predetermined value of a weight parameter.

In some embodiments, the method comprises generating, by the control system, the at least one constraint function based on:

$$0 \leq i_k \leq i_{rated}$$
$$0 \leq i_{k-1} \leq i_{rated},$$

where, $i_{k-1}$ represents a reference current for an outgoing phase at a present rotor position of the switched reluctance machine, $i_k$ represents a reference current for an incoming phase at the present rotor position of the switched reluctance machine, and $i_{rated}$ represents an allowable peak current for the switched reluctance machine.

In some embodiments, the method comprises generating, by the control system, the at least one constraint function based on:

$$T_{ref} = T(i_k, \theta_k) + T(i_{k-1}, \theta_{k-1}),$$

where, $T_{ref}$ represents a reference torque for the switched reluctance machine, $T(i_{k-1}, \theta_{k-1})$ represents a phase torque for the switched reluctance machine in the outgoing phase, and $T(i_k, \theta_k)$ represents a phase torque of the switched reluctance machine in the incoming phase.

In some embodiments, the method comprises generating, by the control system, the at least one constraint function based on:

$$\frac{\Delta\lambda(i_k, \theta_k)}{\Delta t} \leq V_{DC} - i_k R$$

$$\frac{\Delta\lambda(i_k, \theta_k)}{\Delta t} \geq -V_{DC} + i_k R$$

$$\frac{\Delta\lambda(i_{k-1}, \theta_{k-1})}{\Delta t} \leq V_{DC} - i_{k-1} R$$

$$\frac{\Delta\lambda(i_{k-1}, \theta_{k-1})}{\Delta t} \geq -V_{DC} + i_{k-1} R$$

where, $V_{DC}$ represents a dc-link voltage supplied to the switched reluctance machine, R represents a phase resistance, λ represents a phase flux linkage, Δt represents the sampling period, represents a reference current for an outgoing phase of the switched reluctance machine, $i_k$ represents a reference current for an incoming phase of the switched reluctance machine, $\theta_{k-1}$ represents a rotor position for the outgoing phase of the switched reluctance machine, and $\theta_k$ represents a rotor position for the incoming phase of the switched reluctance machine.

In a further aspect, in at least one embodiment described herein, there is provided a method of controlling a switched reluctance machine, where the switched reluctance machine comprises an axially extending shaft, an axially extending rotor mounted to the shaft, an axially extending stator disposed coaxially and concentrically with the rotor, where the rotor has a plurality of salient rotor poles, and the stator has a plurality of salient stator poles protruding radially from the stator towards the rotor poles, and a plurality of electrical coils wound about the stator poles, the plurality of electrical coils including a plurality of separate phase coils defining a plurality of phases of the switched reluctance machine. The method comprises generating, by a control system operatively coupled to a current controller for the switched reluctance machine, a unique set of current reference profiles based on an objective function and at least one constraint function, and operating the switched reluctance machine based on the unique set of current profiles generated by the control system.

In some embodiments, the method comprises receiving a predetermined value of a weight parameter, σ, by the control system to generate the objective function.

In some embodiments, the method comprises generating, by the control system, the objective function based on:

$$J = i_k^2 + \sigma i_{k-1}^2,$$

where, $i_{k-1}$ represents a reference current for an outgoing phase at a present rotor position of the switched reluctance machine, $i_k$ represents a reference current for an incoming phase at the present rotor position of the switched reluctance machine, and σ represents a predetermined value of a weight parameter.

In some embodiments, the method comprises generating, by the control system, the at least one constraint function based on:

$$0 \leq i_k \leq i_{rated}$$
$$0 \leq i_{k-1} \leq i_{rated},$$

where, $i_{k-1}$ represents a reference current for an outgoing phase at a present rotor position of the switched reluctance machine, $i_k$ represents a reference current for an incoming phase at the present rotor position of the switched reluctance machine, and $i_{rated}$ represents an allowable peak current for the switched reluctance machine.

In some embodiments, the method comprises generating, by the control system, the at least one constraint function based on:

$$T_{ref} = T(i_k, \theta_k) + T(i_{k-1}, \theta_{k-1}),$$

where, $T_{ref}$ represents a reference torque for the switched reluctance machine, $T(i_{k-1}, \theta_{k-1})$ represents a phase torque for the switched reluctance machine in the outgoing phase, and $T(i_k, \theta_k)$ represents a phase torque of the switched reluctance machine in the incoming phase.

In some embodiments, the method comprises generating, by the control system, the at least one constraint function based on:

$$\frac{\Delta\lambda(i_k, \theta_k)}{\Delta t} \leq V_{DC} - i_k R$$

$$\frac{\Delta\lambda(i_k, \theta_k)}{\Delta t} \geq -V_{DC} + i_k R$$

$$\frac{\Delta\lambda(i_{k-1}, \theta_{k-1})}{\Delta t} \leq V_{DC} - i_{k-1} R$$

$$\frac{\Delta\lambda(i_{k-1}, \theta_{k-1})}{\Delta t} \geq -V_{DC} + i_{k-1} R$$

where, $V_{DC}$ represents a dc-link voltage supplied to the switched reluctance machine, R represents a phase resistance, λ represents a phase flux linkage, Δt represents the sampling period, $i_{k-1}$ represents a reference current for an outgoing phase of the switched reluctance machine, $i_k$ represents a reference current for an incoming phase of the switched reluctance machine, $\theta_{k-1}$ represents a rotor position for the outgoing phase of the switched reluctance machine, and $\theta_k$ represents a rotor position for the incoming phase of the switched reluctance machine.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

DRAWINGS

For a better understanding of the various embodiments described herein, and to show more clearly how these various embodiments may be carried into effect, reference will be made, by way of example, to the accompanying drawings which show at least one example embodiment and which will now be briefly described.

FIG. 3A shows a circuit diagram of an asymmetric bridge converter according to an example;

FIG. 3B shows a circuit diagram of an example state of an asymmetric bridge converter;

FIG. 3C shows a circuit diagram of another example state of an asymmetric bridge converter;

FIG. 3D shows a circuit diagram of another example state of an asymmetric bridge converter;

Figure 1:
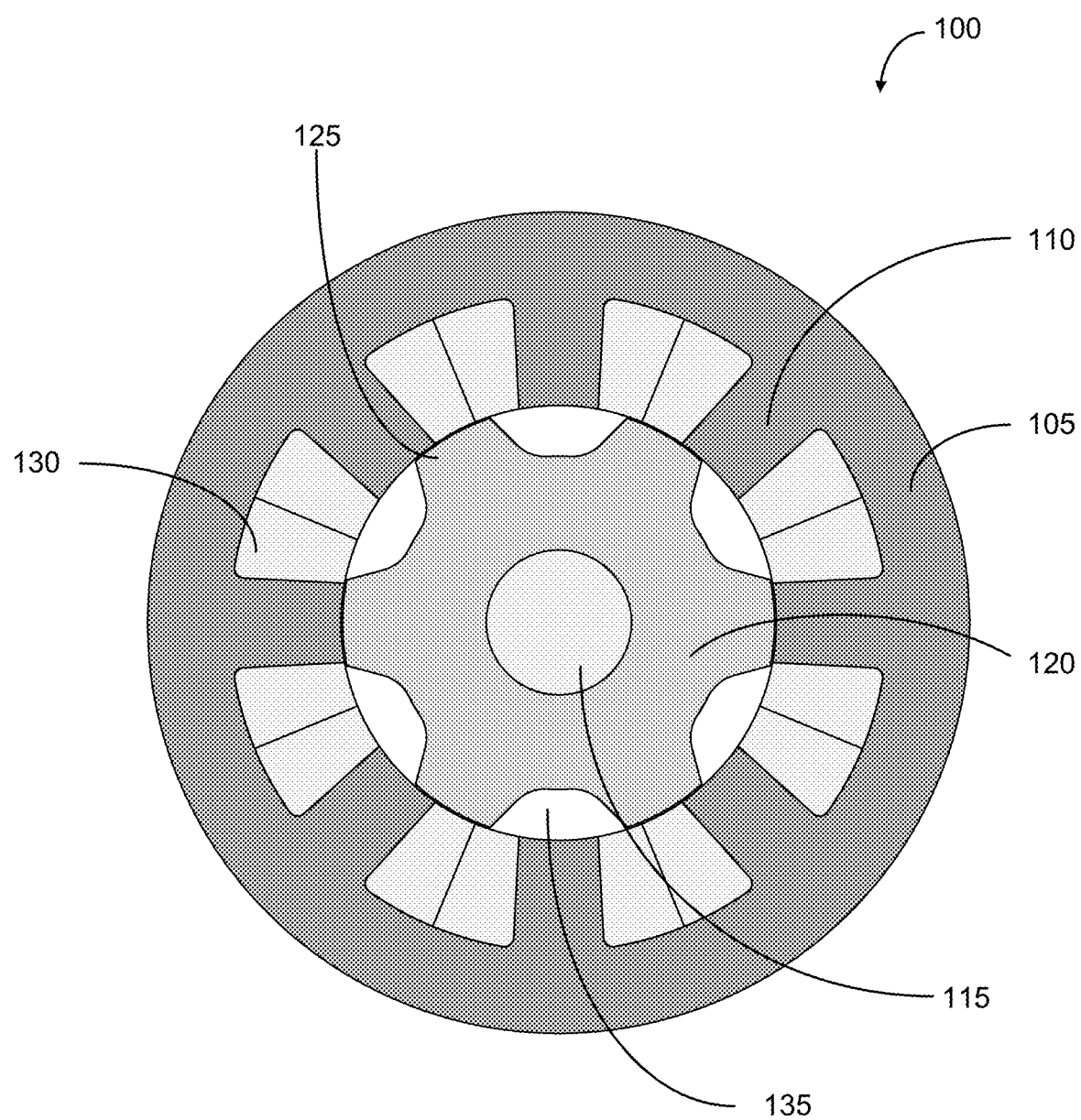
FIG. 1 shows a cross sectional view of a switched reluctance machine according to an example.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. Further, where considered appropriate, reference numerals may be repeated among the figures to indicate corresponding or analogous elements.

DETAILED DESCRIPTION

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

As used in this application, the singular forms "a", "an" and "the" include plural references unless the content clearly dictates otherwise.

In embodiments comprising an "additional" or "second" component, the second component as used herein is physically different from the other components or first component. A "third" component is different from the other, first, and second components, and further enumerated or "additional" components are similarly different.

The term "and/or" as used herein means that the listed items are present, or used, individually or in combination. In effect, this term means that "at least one of" or "one or more" of the listed items is used or present.

Embodiments described herein relate to switched reluctance machines (SRMs). FIG. 1 shows a cross-sectional view of an example switched reluctance machine 100. The SRM 100 is an example of a switched reluctance machine with eight (8) stator poles and six (6) rotor poles. The SRM 100 includes salient poles on the rotor and the stator. The SRM 100 also has concentrated coil windings. The salient pole configuration on both the rotor and the stator provides a relatively simple manufacturing process and robust operation for SRM.

As shown, switched reluctance machine 100 includes a stator 105 and a rotor 120. The rotor 120 is mounted to a rotatable shaft 115. The stator 105 and rotor 120 may be disposed concentrically and coaxially with one another and with the shaft 115. In the SRM 100, the rotor 120 is positioned radially inward of the stator 105.

Both the stator 105 and rotor 120 include a plurality of protrusions that define salient teeth or salient poles. The stator 105 has a stator core that includes a plurality of stator teeth 110, in this case eight stator teeth 110. The rotor 120 includes a plurality of rotor teeth 125, in this case six rotor teeth 125. The stator teeth 110 protrude radially from the stator core towards the rotor 120. Similarly, the rotor teeth 125 protrude radially from the rotor 120 towards the stator 105.

An air gap 135 is also provided between the rotor poles 125 and the stator poles 110. The shaft 115 may be positioned within a central bore of the machine 100. As mentioned above, the SRM 100 is an example of an eight stator pole and six rotor pole switched reluctance machine with concentrated coil windings. That is, the stator 105 has coil windings 130 around each stator tooth 110.

The coils 130 are wound around each stator tooth 110 and connected together to create the phase windings for each phase. SRMs may be designed with varying numbers of stator and rotor poles, and varying number of phases. In general, SRMs typically do not include excitation sources on the rotor 120.

In an SRM, such as SRM 100, the windings 130 in different phases are energized as a function of the position of rotor 120. The rotor position, accordingly, also impacts the air gap 135 and phase inductance of the SRM 100.

In an SRM, such as SRM 100, reluctance torque is the sole torque producing mechanism. When phase windings on the stator poles 110 of SRM 100 are excited with current, the excited pole draws the nearest rotor pole 125 into alignment with it to minimize the reluctance in the phase. In order to create motoring torque, the phases are excited on the rising slope of their inductance profiles.

As illustrated in SRM 100, concentrated winding scheme is used and manipulated strategically to maintain motoring torque. In particular, the current is sequentially applied to different phases of SRM 100 to maintain motoring torque. The current applied to the different phases of SRM 100 may be pulsated, rectangular current profiles.

Figure 2:
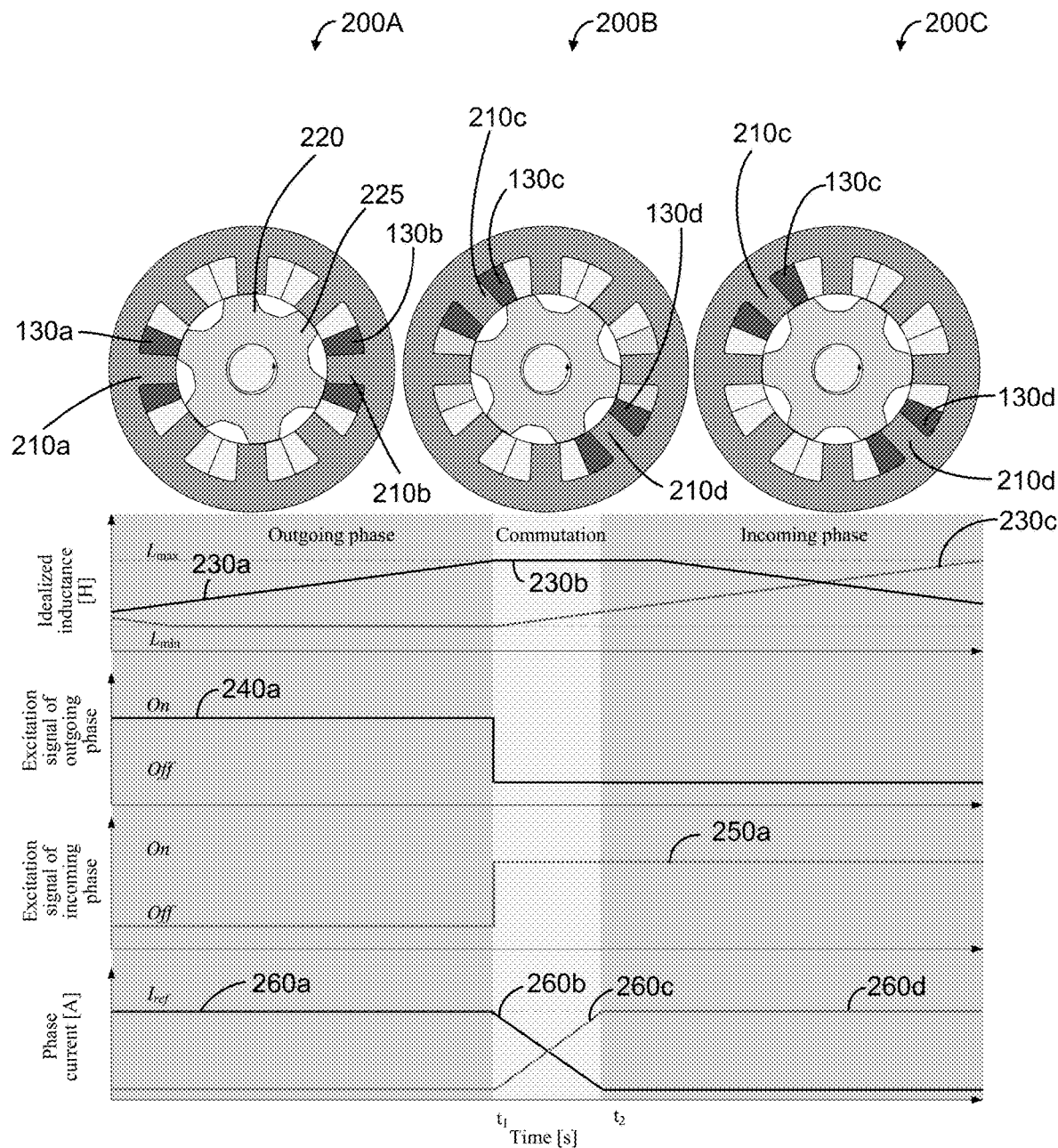
FIG. 2 shows cross sectional views of different configurations of switched reluctance machines and corresponding plots according to an example.

FIG. 2 shows example configurations of SRM, such as SRM 100. In particular, FIG. 2 shows the SRM configurations as they relate to the commutation period during the operation of the SRM. FIG. 2 also shows a corresponding plot containing timing waveforms corresponding to the SRM configurations.

As illustrated in FIG. 2, a SRM analogous to SRM 100 of FIG. 1, is shown in different configurations. In a first configuration 200A, electrical current is provided to the coil windings 130a and opposing coil windings 130b to induce an electromagnetic field. The coil windings 130a thereby excite the stator poles 210a by inducing magnetic flux in the stator poles 210a. Similarly, the coil windings 130b excite the stator poles 210b by inducing magnetic flux in the stator poles 210b. The magnetic flux then passes through to the rotor 220. The rotor 220 is rotatable to align the rotor poles 225 with the stator poles 210a and 210b as a result of the induced magnetic flux.

In the configuration 200A, the idealized inductance (H) is in an outgoing phase, as shown by waveform 230a. Also, in this configuration 200A, the electrical current to each of the coil windings 130a, 130b is activated, as shown by excitation signal of outgoing phase waveform 240a. The phase current (A) in the coil windings 130a, 130b is the reference current, $I_{ref}$, as shown by waveform 260a.

In the next configuration 200B, the electrical current to the coil windings 130a, 130b is removed and electrical current to the coil windings 130c, 130d is introduced. In this configuration, the electrical current provided to coil windings 130c induces an electromagnetic field to excite the stator poles 210c. Similarly, the electrical current provided to coil windings 130d induces an electromagnetic field to excite the stator poles 210d.

In this configuration 200B, both the incoming phases (i.e. coils 130c and 130d) are being energized, and the outgoing phases (i.e. coils 130a and 130b that were energized in configuration 200A) are being de-energized. This period where one phase demagnetizes while another phase begins magnetization is referred to as commutation period.

As illustrated in configuration 200B, between the first time, $t_1$, and the second time, $t_2$, i.e. in the commutation period, the idealized inductance (H) of the SRM is at $L_{max}$ level 230b. Also in the commutation period, the incoming phase is energized, as shown by waveform 250a. However, in the commutation period, the phase current 260b for the outgoing phase drops from $I_{ref}$ to 0 A, Similarly, the phase current 260c for the incoming phase increases from 0 to $I_{ref}$ A.

In the next configuration 200C, the coil windings 130c are energized that thereby excites the stator poles $210_c$. Similarly, the coil windings 130d are energized and thereby excite the stator poles $210_d$. In this configuration, the idealized inductance (H) 230c of the incoming phase (i.e. coils 130c and 130d) increases from $L_{min}$ to $L_{max}$. In this configuration, the phase current of the coil windings 130c, 130d is the reference current, $I_{ref}$, as shown by waveform 260d.

The dynamics of one phase of SRM may be characterized by equation (1), where V is the magnitude of the dc-link voltage, R is the phase resistance, and λ is the flux linkage:

$$V_{dc} = iR + \frac{d\lambda}{dt} \quad (1)$$

Typically, the current in each phase is controlled by an asymmetric bridge converter, and the magnitude of the voltage seen by the phase depends on the state of the converter. FIG. 3A shows an example circuit diagram of an asymmetric bridge converter 300A for a three-phase SRM such as SRM 100. In the asymmetric bridge converter 300A, a power source 305 is coupled in parallel to a serial combination of a first switch 310a and a first diode 315a, and a serial combination of a second diode 315b and a second switch 310b. As illustrated, the node between the first switch 310a and the first diode 315a is connected to the node between the second diode 315b and the second switch 310b via phase coil 320. The power source 305 is a DC-link voltage.

FIGS. 3B-3D illustrate different configurations of the asymmetric bridge converter during the operation of a SRM, such as SRM 100. In FIG. 3B, both the first switch 310a and the second switch 310b of the asymmetric bridge converter 300B are closed. Accordingly, in the configuration 300B, a positive dc-link voltage 305 is applied, and the switches 310a, 310b are configured to conduct. The current path in this configuration includes the DC-link voltage, the first switch 310a, the phase coil 320 and the second switch 310b.

FIG. 3C illustrates a configuration 300C of the asymmetric bridge converter, where both the first switch 310a and the second switch 310b are open. In the configuration 300C, a negative dc-link voltage 305 is applied, and the first diode 315a and the second diode 315b are configured to conduct. The current path in this configuration includes the DC-link voltage, the first diode 315a, the phase coil 320 and the second diode 315b.

FIG. 3D illustrates a configuration 300D, which is the configuration of the SRM when zero dc-link voltage is applied. In this configuration, the phases are shorted and the current path includes the first diode 315a, the phase coil 320 and the second switch 310b.

In the commutation period, the flux paths are significantly shorter than that during single phase excitation. The flux created by different phases interacts with one another, causing significant variation in torque production. For this reason, electromagnetic torque ripple is common in the commutation region. Torque ripple is a significant shortcoming in the performance of SRM.

In the SRM 100, the rotor torque may be measured by its average value ($T_{avg}$) using equation (2), and the torque ripple may be considered as the root-mean-square (or rms) value of the variance of torque ($T_{RMS}$), as shown in equation (3). In the equations (2) and (3), the parameters $\theta_{on}$ and $\theta_{off}$ denote the turn-on and turn-off angles in the conduction period, respectively.

$$T_{avg} = \frac{1}{\theta_{off} - \theta_{on}} \int_{\theta_{on}}^{\theta_{off}} T(\theta) d\theta \quad (2)$$

$$\Delta T_{RMS} = \sqrt{\frac{1}{\theta_{off} - \theta_{on}} \int_{\theta_{on}}^{\theta_{off}} (T(\theta) - T_{avg})^2 d\theta} \quad (3)$$

In various cases, finite element modeling of a given SRM may be conducted to generate information about its flux linkage and torque characteristics under constant current excitation over an electrical cycle. This information, referred to as static characteristics, may be stored as look-up tables as a function of electrical position of a rotor, and the current of that phase.

Figure 4:
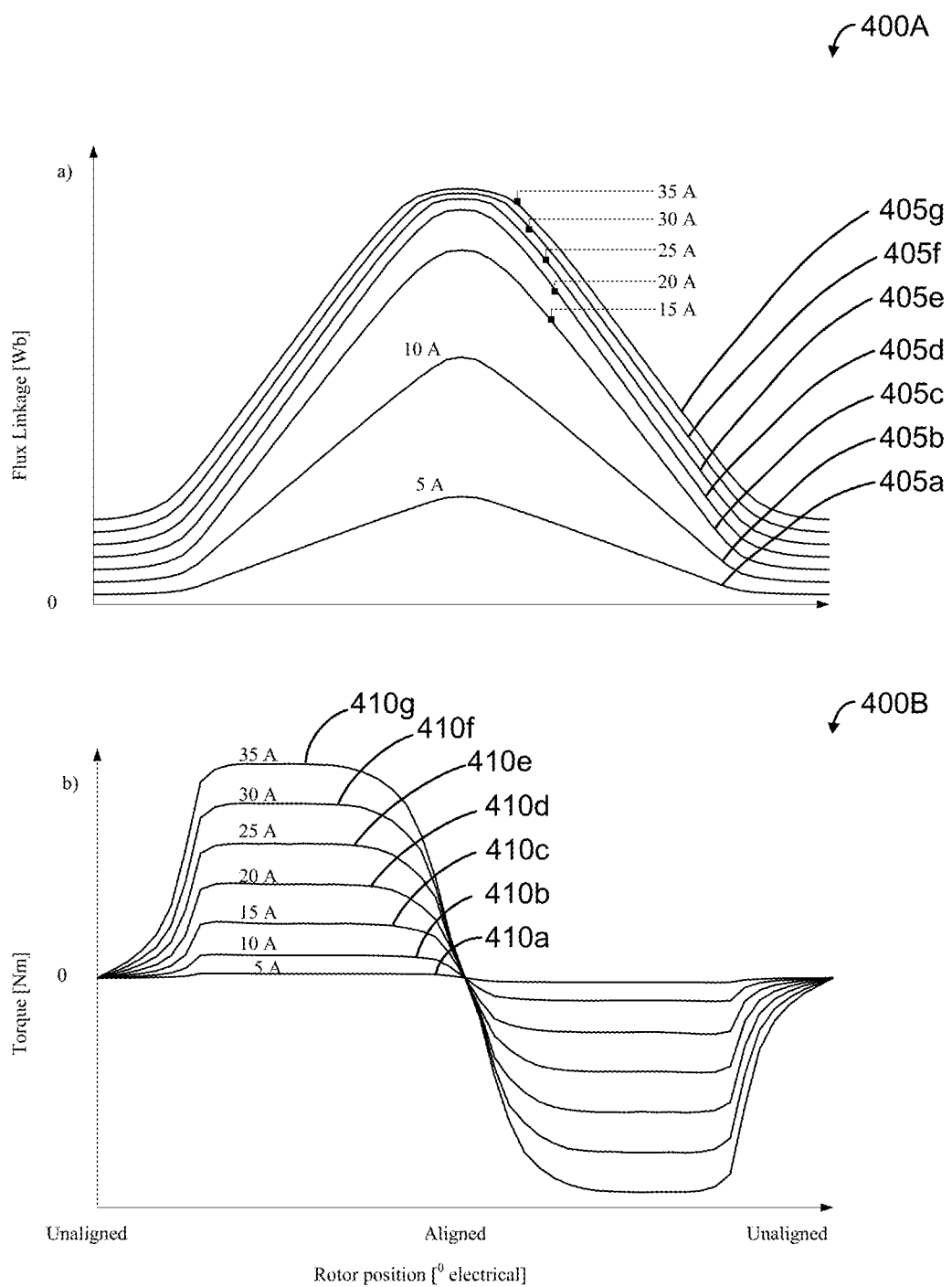
FIG. 4 shows example plots of flux linkages and torque waveforms associated with an example switched reluctance machine.

Reference is next made to FIG. 4, which shows plots of static characteristics of a conventional SRM with concentrated windings. The static characteristics can then be used to model the dynamics of SRM. In particular, FIG. 4 shows a plot 400A containing static flux linkage waveforms of one phase of a switched reluctance machine as a function of rotor position (in degree electrical). Static flux linkage waveforms of plot 400A are generated based on simulations made by exciting one phase of a switched reluctance machine with constant current, and rotating it over one electrical cycle. The simulations are obtained from finite element analysis. FIG. 4 also shows a plot 400B containing torque waveforms associated with the SRM as a function of rotor position (in degree electrical), also obtained from finite element analysis.

Plot 400A illustrates a first flux linkage waveform 405a, which is simulated at 5 A. Plot 400A further illustrates a second flux linkage waveform 405b, which is simulated at 10 A. Third flux linkage waveform 405c simulated at 15 A, fourth flux linkage waveform 405d simulated at 20 A, fifth flux linkage waveform 405e simulated at 25 A, sixth flux linkage waveform 405f simulated at 30 A and seventh flux linkage waveform 405g simulated at 35 A are also shown in plot 400A.

Plot 400B illustrates a first torque waveform 410a, which is simulated at 5 A. Similarly, a second torque waveform 410b simulated at 10 A, a third torque waveform 410c simulated at 15 A, a fourth torque waveform 410d simulated at 20 A, a fifth torque waveform 410e simulated at 25 A, a sixth torque waveform 410f simulated at 30 A and a seventh torque waveform 410g simulated at 35 A are also shown in plot 400B.

In various cases, these static characteristics, i.e. the flux linkage and torque waveforms of plots 400A and 400B, may be stored in one or more lookup tables, for example using a FPGA or other suitable controller. Furthermore, the static characteristics of the SRM may be used to interpolate the dynamic performance of the SRM when variable current is applied.

Conventionally, SRM phase excitation period is dictated by conduction angles. By adjusting the conduction angles, torque production may be manipulated to occur in a favorable period of the electrical cycle, and torque ripple may be minimized. In some cases, phase excitation is advanced at high speeds to ensure good torque production, as it allows time for magnetization before the optimal torque production period. However, there may be limitations to these control methods, as the current profiles are suboptimal due to their rectangular shape.

In some cases, a torque sharing function (TSF) is used to reduce the torque ripple during commutation. A TSF is a method of shaping the phase current to reduce the torque ripple. A TSF takes a constant torque command and distributes it into phase torque commands. This enables a phase current reference profile (or current reference) to be calculated, and when the current reference profile is tracked successfully, the rotor torque ideally becomes constant like the torque command.

One example of a torque sharing function may be expressed using equation (4) below:

$$T_{ref}(k) = \begin{cases} 0 & 0 \le \theta < \theta_{on} \\ T_{ref} f_{rise}(\theta) & \theta_{on} \le \theta < \theta_{on} + \theta_{ov} \\ T_{ref} & \theta_{on} + \theta_{ov} \le \theta < \theta_{off} \\ T_{ref} f_{fall}(\theta) & \theta_{off} \le \theta < \theta_{off} + \theta_{ov} \\ 0 & \theta_{off} + \theta_{ov} \le \theta \le \theta_p \end{cases} \quad (4)$$

In equation (4), the $T_{ref}$ is the total torque reference and $T_{ref(k)}$ is the reference torque for $k^{th}$ phase. The functions $f_{rise}(\theta)$ and $f_{fall}(\theta)$ are respectively the rising function for the incoming phase that increases from zero to one, as well as the decreasing function for the outgoing phase that decreases from one to zero, for some rotor position, $\theta$. The conduction angle parameters, $\theta_{on}$, $\theta_{off}$, $\theta_{op}$ and $\theta_p$, determine respectively when the phase begins excitations, when the phase ends excitation, the duration of the commutation period when two phases overlap, and the duration of the maximum possible period of excitation.

The parameter $\theta_p$ is the pole pitch of the machine, which depends on the number of rotor poles, $N_p$. In units of radians, $\theta_p$ may be expressed as equation (5).

$$\theta_p = \frac{2\pi}{N_p} \quad (5)$$

Conventional TSFs can include linear, cubic and exponential TSFs. These TSFs may be generally summarized as follows. A linear TSF may be used as an analytical function to approximate the dynamics of the phase torque in the commutation region for $f_{rise}(\theta)$ and $f_{fall}(\theta)$. An example of a linear TSF may be represented as in equation (6) below.

$$f_{rise}(\theta) = \frac{1}{\theta_{ov}}(\theta - \theta_{on}) \quad (6)$$

$$f_{fall}(\theta) = 1 - f_{rise}(\theta + \theta_{on} - \theta_{off})$$

A cubic TSF may be used as an analytical function to approximate the dynamics of the phase torque in the commutation region for $f_{rise}(\theta)$ and $f_{fall}(\theta)$. An example of a cubic TSF may be represented as in equation (7) below.

$$f_{rise}(\theta) = \frac{3}{\theta_{ov}^2}(\theta - \theta_{on})^2 - \frac{2}{\theta_{ov}^3}(\theta - \theta_{on})^3 \quad (7)$$

$$f_{fall}(\theta) = 1 - f_{rise}(\theta + \theta_{on} - \theta_{off})$$

Similarly, a sinusoidal TSF may be used as an analytical function to approximate the dynamics of the phase torque in the commutation region for $f_{rise}(\theta)$ and $f_{fall}(\theta)$. An example of a sinusoidal TSF may be represented as in equation (8) below.

$$f_{rise}(\theta) = 0.5\left(1 - \cos\left(\frac{\pi}{\theta_{ov}}(\theta - \theta_{on})\right)\right) \quad (8)$$

$$f_{fall}(\theta) = 1 - f_{rise}(\theta + \theta_{on} - \theta_{off})$$

In some other cases, an exponential TSF may be used as an analytical function to approximate the dynamics of the phase torque in the commutation region for $f_{rise}(\theta)$ and $f_{fall}(\theta)$. An example of an exponential TSF may be expressed as in equation (9) below.

$$f_{rise}(\theta) = 1 - \exp\left(\frac{-(\theta - \theta_{on})^2}{\theta_{ov}}\right) \quad (9)$$

$$f_{fall}(\theta) = 1 - f_{rise}(\theta + \theta_{on} - \theta_{off})$$

One drawback to the conventional TSFs may be that they explicitly define the torque reference. In order to create the current reference, an inversion of the torque reference may be required, which may require additional modeling or an explicit inversion of the torque characteristics of the machine. Due to the nonlinear nature of SRM, either option may be difficult to implement in practice.

Figure 5:
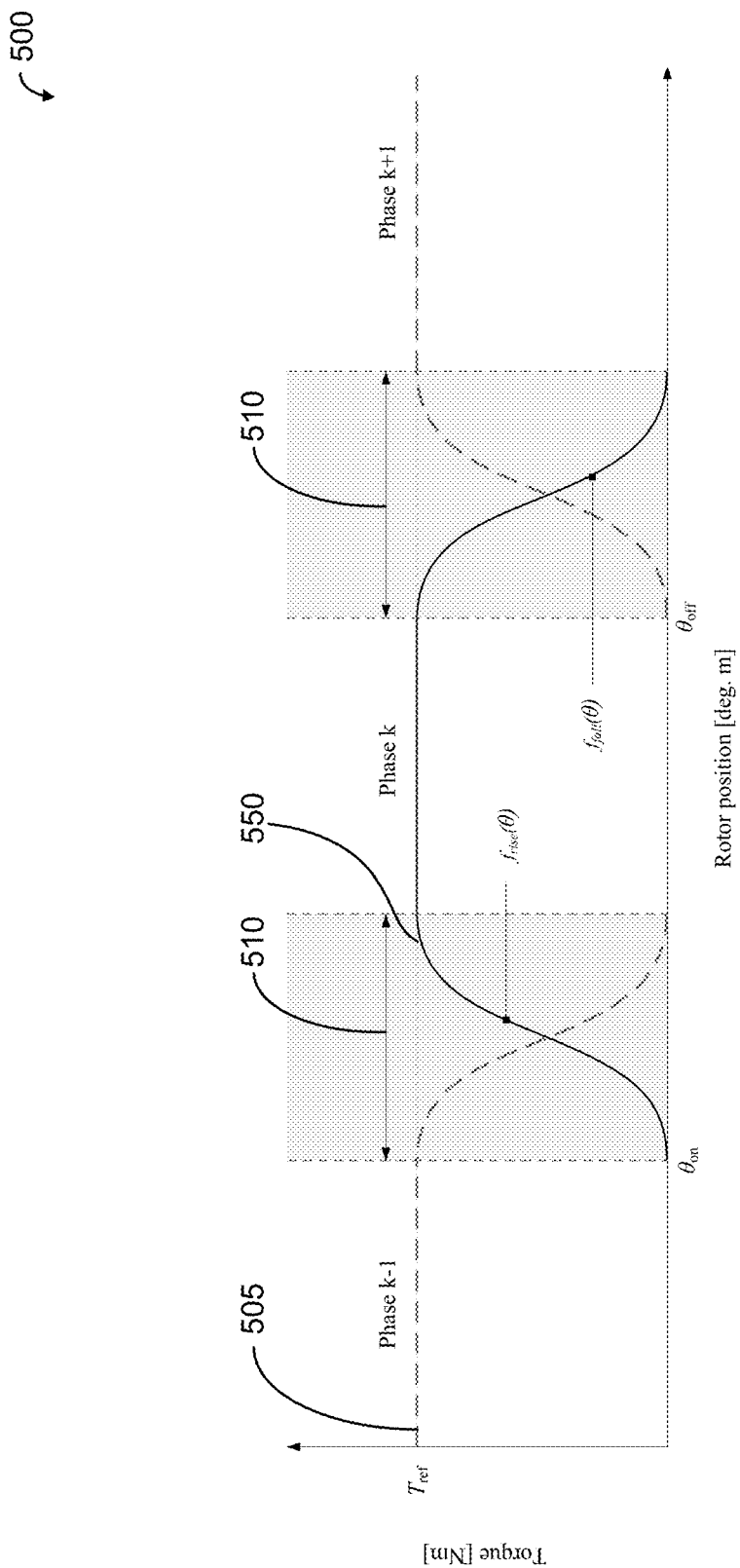
FIG. 5 shows an example plot of the torque waveform of an example switched reluctance machine with a torque sharing function.

Reference is made to FIG. 5, which illustrates a plot 500 of a torque waveform 505 when a conventional torque sharing function is used in a SRM. The torque waveform 505 shows the torque command 550 that may be achieved in each phase. During the commutation period 510, it is shown that the torque contribution of both phases is equal to the torque command. In the rest of the excitation period, the total torque command is met by a single phase.

In various cases, since the torque references are calculated based on analytical expressions instead of being derived from the model of the system, the performance of the conventional TSFs is sensitive to changes in the parameters $\theta_{on}$, $\theta_{off}$ and $\theta_{ov}$. This may affect the shape of the functions $f_{rise}(\theta)$ and $f_{fall}(\theta)$. In the cases where the conventional TSFs are effective, they are effective because the parameters $\theta_{on}$, $\theta_{off}$ and $\theta_{ov}$ are selected so that the dynamics of the torque in the torque reference closely matches the actual dynamics stipulated by the rate of change of the current in the phases. In other words, the current dynamics in the phase matches closely to the current dynamics of the current reference, which allows good tracking performance of the reference current.

Figure 6A:
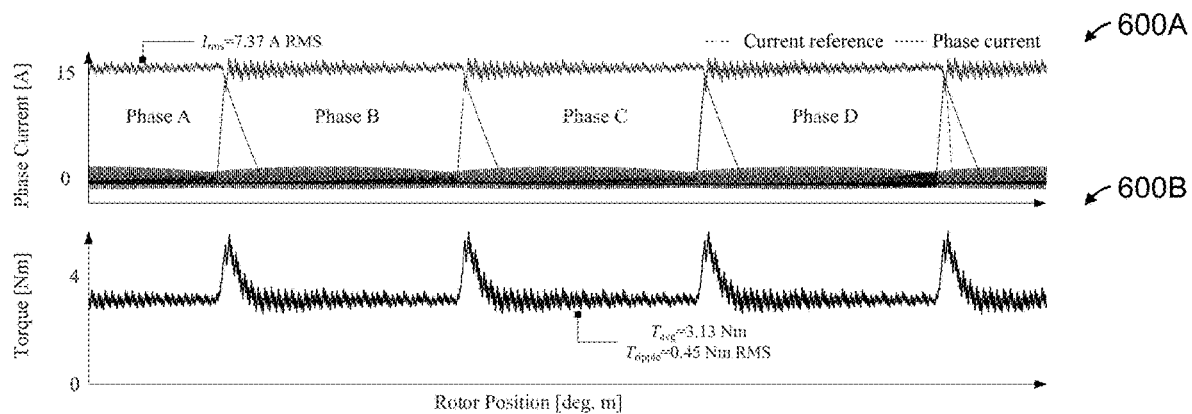
FIG. 6A shows example simulation plots associated with a switched reluctance machine at 1000 RPM, 3 Nm with a cubic torque sharing function for an example overlap angle.
Figure 6B:
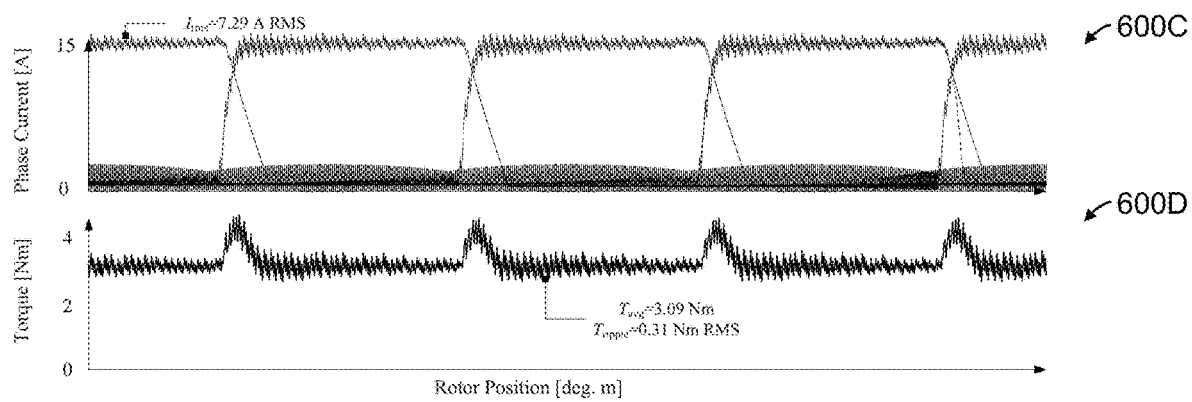
FIG. 6B shows example simulation plots associated with a switched reluctance machine at 1000 RPM, 3 Nm with a cubic torque sharing function for an overlap angle according to another example.
Figure 6C:
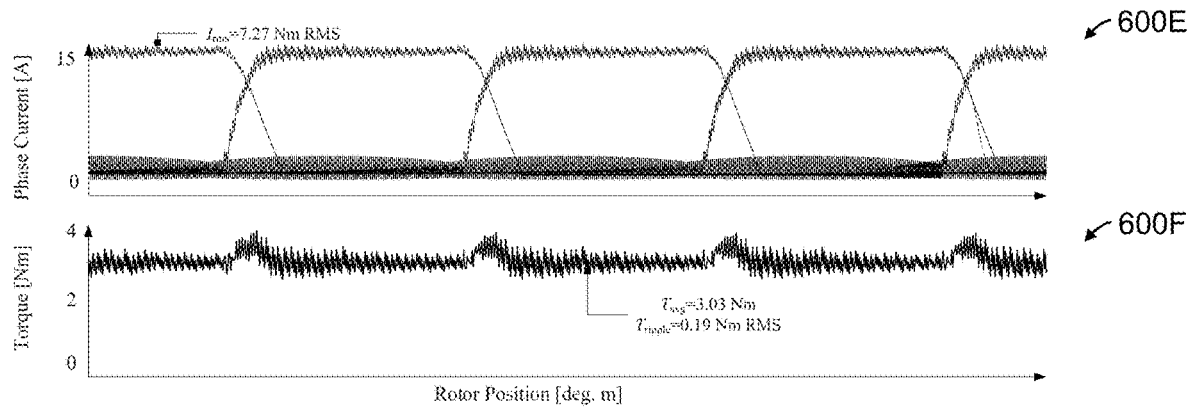
FIG. 6C shows example simulation plots associated with a switched reluctance machine at 1000 RPM, 3 Nm with a cubic torque sharing function for an overlap angle according to a further example.

Reference is next made to FIGS. 6A-6C, which illustrate the simulated plots resulting from a simulation of a four-phase SRM with 8 stator poles and 6 rotor poles, a speed of 1000 RPM, a torque command of 3 Nm and a cubic TSF. In the simulation plots of FIGS. 6A-6C, the overlap angle, $\theta_{ov}$, is changed from 5 degree electrical to 20 degree electrical, while the turn-on and turn-off angles remain fixed at 48 degree and 140 degree electrical respectively. The overlap angle, $\theta_{ov}$, represents the rate of change of current in the commutation region.

In particular, FIG. 6A illustrates the simulated results of the four-phase SRM when the overlap angle, $\theta_{ov}$, is 5 degree electrical. Corresponding phase current waveforms 600A and torque waveforms 600B are shown in FIG. 6A. FIG. 6B illustrates the simulated results of the four-phase SRM when the overlap angle, $\theta_{ov}$, is 10 degree electrical. Corresponding phase current waveforms 600C and torque waveforms 600D are shown in FIG. 6B. FIG. 6C illustrates the simulated results of the four-phase SRM when the overlap angle, $\theta_{ov}$, is 20 degree electrical. Corresponding phase current waveforms 600E and torque waveforms 600F are shown in FIG. 6C.

As illustrated in FIGS. 6A-6C, each of the waveforms 600A, 600C and 600E show the phase currents resulting from the simulations along with the reference currents provided by the cubic TSF. It may be seen that as the overlap angle is increased from FIG. 6A to 6C, the rate of change of current in the current reference matches more closely to the actual phase current dynamics, resulting in a reduction in the torque ripple.

However, as shown in FIGS. 6A-6C, the rate of change of outgoing phase current is lower bounded by the voltage in the phase, and it itself cannot adjust to meet the current reference. Considering that it is important for the current reference to match closely to the actual current dynamics, conventional torque sharing functions may be inefficient in producing current references. This may be because the shape of the torque in the commutation region is limited to the functions presented in (6)-(9), which has no bearing to the actual dynamics of the phase currents.

Conventional TSFs of FIGS. 6A-6C may not be able to achieve optimal torque ripple reduction performance. This may be especially obvious at high speeds, where the induced voltage in the phase further constrains the dynamics of the current.

In some cases, a different family of offline TSF(s) may be used with the SRM to reduce the torque ripple. For example, a logical TSF may be used with SRMs to distribute torque based on discretized states for different phases. With a logical TSF, the current reference profiles may be shaped in conjunction with preliminary geometry designs that creates suitable static torque characteristics.

In another example, a non-unity torque sharing function for a switched reluctance machine may be used. In yet another example, a closed loop online TSF may be used with a Proportional-Integral (PI) controller that compensates the torque tracking error in the phase with better tracking capabilities.

In another example, an objective function used to produce the current reference may consist of the phase currents to reduce the copper losses. In some cases, both the phase current and the phase voltage have been considered as the objective function to minimize the copper losses while extending the speed range.

In some other cases, a TSF which uses the rate of change of current in the objective function has been applied. Similarly, in some cases, the copper losses have been minimized in the objective function, while the phase voltage is considered in the constraints. However, such torque sharing functions lack the ability to flexibly adjust the current reference profiles, and is therefore limited in speed range.

In some cases, the $\rho$ norm of the phase currents is minimized by an objective function. By varying the parameter $\rho$, current reference profiles are instantiated with varying rate of change in the commutation region. In some other cases, the objective functions are not only included the phase currents, but also the rate of change of phase current. These two objectives may then be balanced by a weight parameter. Another weight parameter is used in this family of TSFs to penalize the outgoing phase current to avoid negative torque production in the outgoing phase.

The performance of TSF may be measured based on metrics. For example, the performance of TSF may be measured based on the amount of copper losses associated with meeting a constant torque command. In another example, the performance of TSF may be measured based on the effective speed range of the TSF.

In some cases, the copper losses are defined by the rms value of the phase current over one electrical period. Equation (10) illustrates an example of the copper losses.

$$P_{cu,k} = R I_{rms,k}^2 \tag{10}$$

In some cases, the rms value of the phase current is illustrated in equation (11).

$$I_{rms,k} = \sqrt{\frac{1}{(\theta_{off} - \theta_{on})} \int_{\theta_{on}}^{\theta_{off}} i_k^2 d\theta} \tag{11}$$

By minimizing the rms value of the phase current, equation (10) shows that the copper losses may be minimized. However, as the machine speed increases, higher voltages are induced in the phase. This may inhibit the rate of change of flux in the machine. The relationship between the machine speed, $\omega$, and the rate of change of flux linkage, $\lambda$, may be expressed by equation (12).

$$\frac{V}{\omega} = \frac{\partial \lambda(\theta, i)}{\partial \theta} \tag{12}$$

The relationship in equation (12) may be derived from the voltage equation of SRM, after neglecting the voltage drop due to the phase resistance and assuming steady state. This means that as the speed of the SRM increases, the rate of change of current is inhibited by the high induced voltage in the system, and so the current reference becomes harder to track. For a TSF to maximize its speed range, its current reference must be traceable at high speeds.

Figure 7:
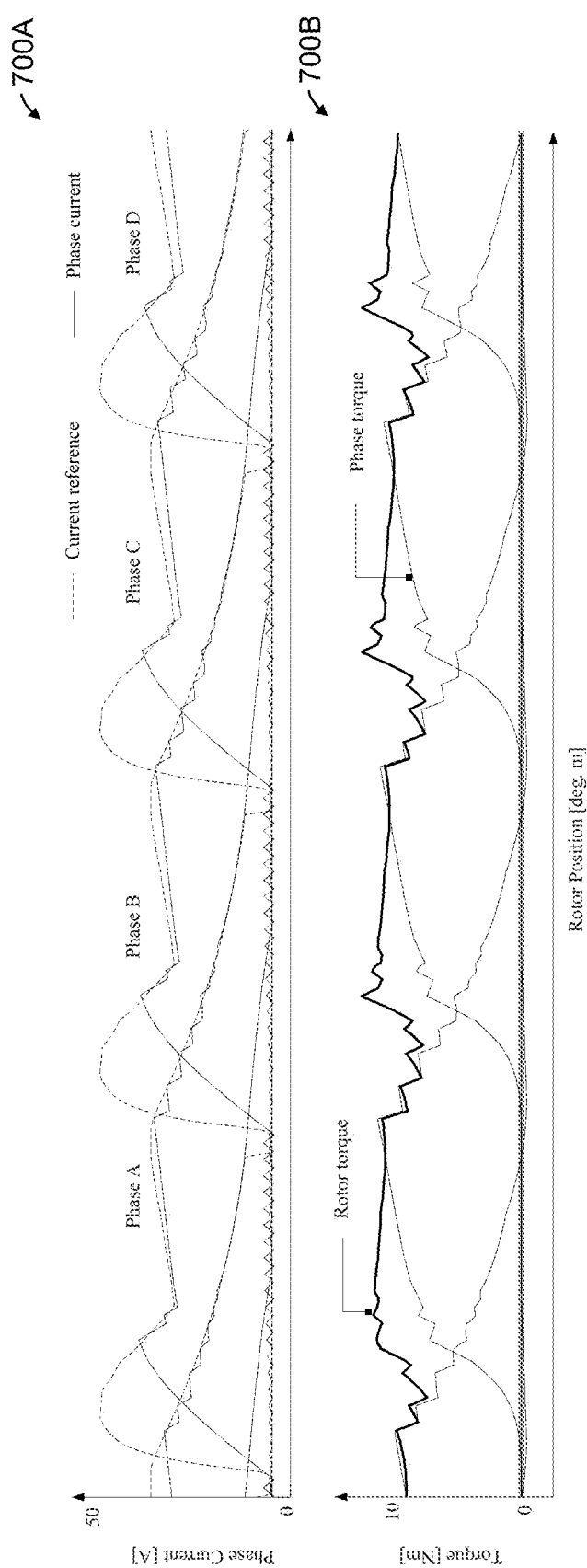
FIG. 7 shows example simulation plots associated with a switched reluctance machine at 6000 RPM, 10 Nm with an example torque sharing function.

Reference is made to FIG. 7, which illustrates simulation plots of a SRM using a conventional TSF. In the simulation of FIG. 7, the phase currents have been set as the objective function and the weight parameter on prioritizing rate of change of current objective is tuned higher to obtain current reference profiles with lower rate of change of current. FIG. 7 shows phase current waveforms 700A and torque waveforms 700B.

Phase current waveform 700A shows that there is a significant current tracking error in the incoming phase due to high rate of change in the reference. In this case, the rate of change of the actual current in the incoming phase is limited due to the high induced voltage. This results in 0.92 Nm rms torque ripple in the torque shown in the waveform 700B.

The various embodiments disclosed herein generally relate to a torque ripple reduction technique and a technique for generating a unique set of current reference profiles for torque ripple minimization in SRMs. In particular, the various embodiments disclosed herein relate to an offline procedure to obtain a current reference profile that minimizes electromagnetic torque ripple.

Due to the salient structure of SRMs and position-dependent inductance characteristics, SRM relies on reluctance torque since that is the only torque production mechanism in SRMs. Consequently, the SRMs require pulsated current excitation for torque production. However, the pulsated current excitation results in significant torque ripple during the commutation period of the excitation.

Embodiments described herein relate to a proposed TSF that considers information about the flux linkage and torque production of the SRM. In particular, the embodiments described herein optimize the flux linkage and torque production information associated with the SRM and calculate the required phase currents at a given rotor position to minimize the amount of torque ripple produced. The proposed TSF disclosed by the embodiments herein is further processed at higher speeds to create current reference profiles suitable for tracking the SRM at all operating points.

The proposed TSF is based on optimization methods to create a current reference profile that achieves minimal copper losses. As well, by utilizing the flux linkage and torque information of the machine in the optimization of the current reference, the current reference tracking error is minimized. The proposed TSF also includes an adjustable single weight parameter to vary the shape and conduction period of the reference current.

Figure 8:
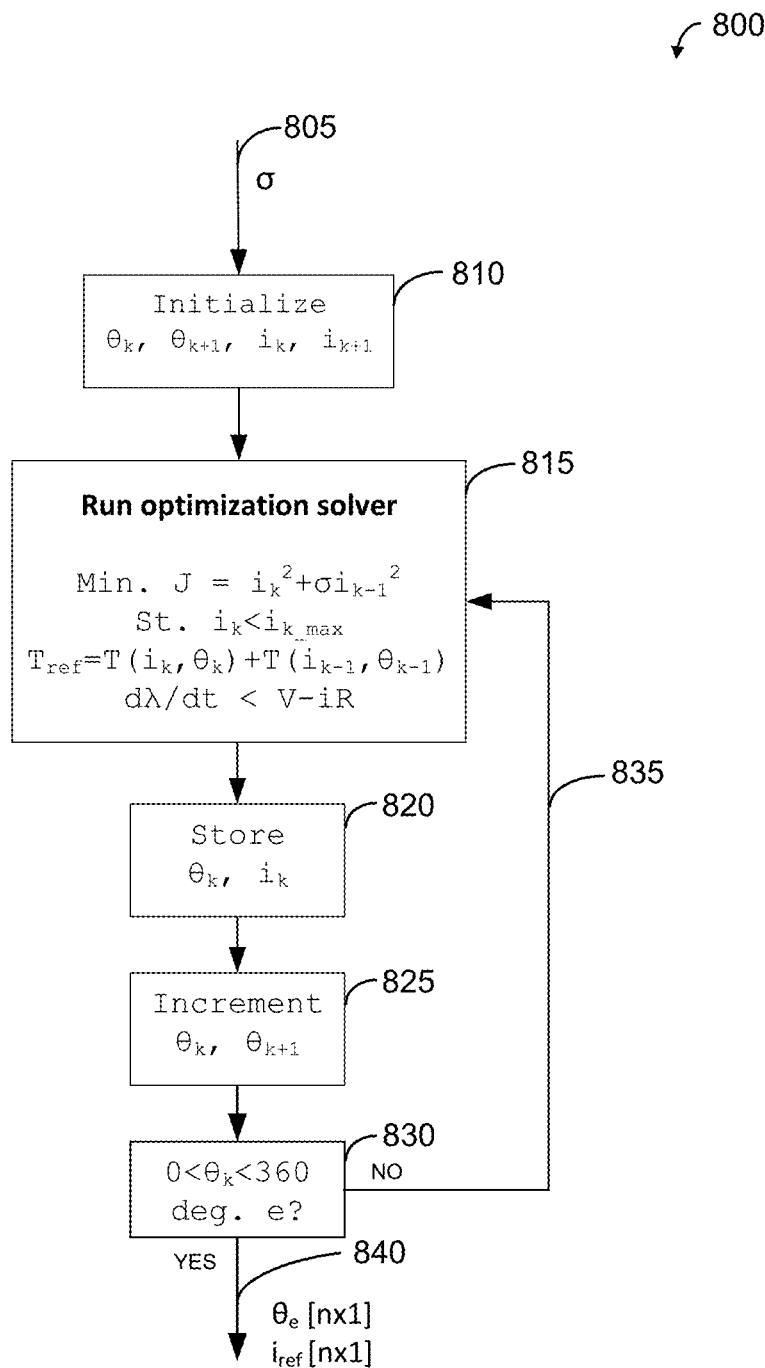
FIG. 8 shows a flowchart of an example process for generating a current reference profile using the proposed torque sharing function in accordance with an embodiment.

Reference is made to FIG. 8, which illustrates a process 800 that may be used to determine the proposed TSF, and in particular, a unique set of current reference profiles of the proposed TSF, as disclosed herein. Process 800 may be carried out by a control system operatively coupled to a current controller for the SRM. The unique set of current reference profiles may be generated by the control system based on an objective function and at least one constraint function associated with the SRM. Process 800 may be carried out offline by the control system.

As discussed below, the proposed TSF is formulated using the static flux linkage characteristics of the SRM in the constraints, which limits the rate of change of the current reference. An advantage provided by the proposed TSF disclosed herein relates to an optimized tracking performance by the current reference profiles at all applicable speeds. Furthermore, the proposed TSF disclosed herein uses an increased weight parameter. By increasing the weight parameter, the shape and conduction period of the current reference profile may be modified to achieve conduction at different points within the electrical cycle.

The method 800 begins at 805, where a predetermined value of a weight parameter, σ, is provided to the control system.

Next, at 810, phase current and rotor position variables are initialized by the control system. In particular, at 810, initial values are set for the incoming and outgoing phase currents, i.e. variables $i_k$ and $i_{k-1}$. In addition, rotor positions for the incoming and outgoing phases, i.e. variables $\theta_k$ and $\theta_{k-1}$, are initialized.

The process then progresses to 815, where the control system uses the received value of the weight parameter at 805 and the initialized values of other variables at 810 to generate an objective function, J. The objective function may be expressed as shown in equation (13):

$$J = i_k^2 + \sigma i_{k-1}^2 \qquad (13)$$

wherein:
$i_{k-1}$ represents a reference current for an outgoing phase at a present rotor position of the switched reluctance machine, $i_k$ represents a reference current for an incoming phase at the present rotor position of the switched reluctance machine, and σ represents a predetermined value of a weight parameter.

The proposed TSF is optimized by minimizing the phase currents of incoming and outgoing phases, k and k−1, in order to achieve minimum copper loss. The weight parameter is used in equation (13) to penalize the outgoing phase, as it contributes to the production of a negative torque.

Also, at 815, the control system also generates one or more constraint functions for the objective function of equation (13). One linear inequality constraint function generated by the control system is expressed in equation (14):

$$0 \leq i_k \leq i_{rated}$$

$$0 \leq i_{k-1} \leq i_{rated} \qquad (14)$$

wherein:
$i_{k-1}$ represents a reference current for an outgoing phase at a present rotor position of the switched reluctance machine, $i_k$ represents a reference current for an incoming phase at the present rotor position of the switched reluctance machine, and $i_{rated}$ represents an allowable peak current for the switched reluctance machine.

Equation (14) represents the constraint that the phase current should not exceed the maximum allowable current (which may also be referred to as the allowable peak rated values, $i_{rated}$) of the SRM being controlled using the proposed TSF.

In addition, at 815, the control system generates another constraint, i.e. a nonlinear equality constraint, associated with the proposed TSF. This constraint is expressed in equation (15):

$$T_{ref} = T(i_k, \theta_k) + T(i_{k-1}, \theta_{k-1}) \qquad (15)$$

wherein:
$T_{ref}$ represents a reference torque for the switched reluctance machine, $T(i_{k-1}, \theta_{k-1})$ represents a phase torque for the switched reluctance machine in the outgoing phase, and $T(i_k, \theta_k)$ represents a phase torque of the switched reluctance machine in the incoming phase.

The constraint of equation (15) represents that the sum of phase torques in both the active phases must be equal to the total torque reference, $T_{ref}$. In some cases, the torque values T(θ,i) for the incoming and outgoing phases are interpolated from the static characteristics of the SRM.

The control system also generates another constraint at 815. The constraint is expressed in equation (16):

$$\frac{\Delta\lambda(i_k, \theta_k)}{\Delta t} \leq V_{DC} - i_k R \qquad (16)$$

$$\frac{\Delta\lambda(i_k, \theta_k)}{\Delta t} \geq -V_{DC} + i_k R$$

$$\frac{\Delta\lambda(i_{k-1}, \theta_{k-1})}{\Delta t} \leq V_{DC} - i_{k-1} R$$

$$\frac{\Delta\lambda(i_{k-1}, \theta_{k-1})}{\Delta t} \geq -V_{DC} + i_{k-1} R$$

wherein:
$V_{DC}$ represents a dc-link voltage supplied to the switched reluctance machine, R represents a phase resistance, λ represents a phase flux linkage, Δt represents the sampling period, $i_{k-1}$ represents a reference current for an outgoing phase of the switched reluctance machine, $i_k$ represents a reference current for an incoming phase of the switched reluctance machine, $\theta_{k-1}$ represents a rotor position for the outgoing phase of the switched reluctance machine, and $\theta_k$ represents a rotor position for the incoming phase of the switched reluctance machine.

The constraint of equation (16) represents that the rate of change of flux linkages is constrained by the voltage dynamics of one phase of the SRM being controlled using the proposed TSF. In other words, the constraint of equation (16) represents the minimum and maximum possible voltages that may be applied to the phase by modulating the dc-link voltage using switching devices.

In equation (16), the dc-link voltage ($V_{DC}$), the phase resistance (R) and the phase flux linkage (λ) may be obtained as static characteristics. In some cases, the flux linkage λ(θ,i) for the incoming and outgoing phases may be interpolated from the static characteristics of the SRM. In addition, in some cases, the constraint of equation (16) may be generated by subtracting previous time step flux linkage values from present time step flux linkage values.

At 815, the control system analyzes and processes the optimization problem represented by the objective function of the proposed TSF, subject to constraints noted in equations (13)-(16) above.

At 820, one phase of current reference is generated by the control system. The current reference, and the corresponding rotor position, is saved in a lookup table in a memory within the control system.

At 825, the rotor position is incremented by one (1). At 830, the control system determines if all the rotor positions over one electrical period have been sampled. If not, the process proceeds to step 815, where the optimization problem is processed by the control system for the incremented rotor position.

However, if all the rotor positions over one electrical period have been sampled, the process proceeds to 840. At 840, the unique set of current reference profiles for the rotor position over one electrical period are generated for use with the SRM. When the generated unique set of current reference profiles are used with the SRM, the torque ripple generated in the SRM is reduced. As well, with the use of the unique set of current reference profiles, the copper losses in the SRM are also minimized.

Figure 9:
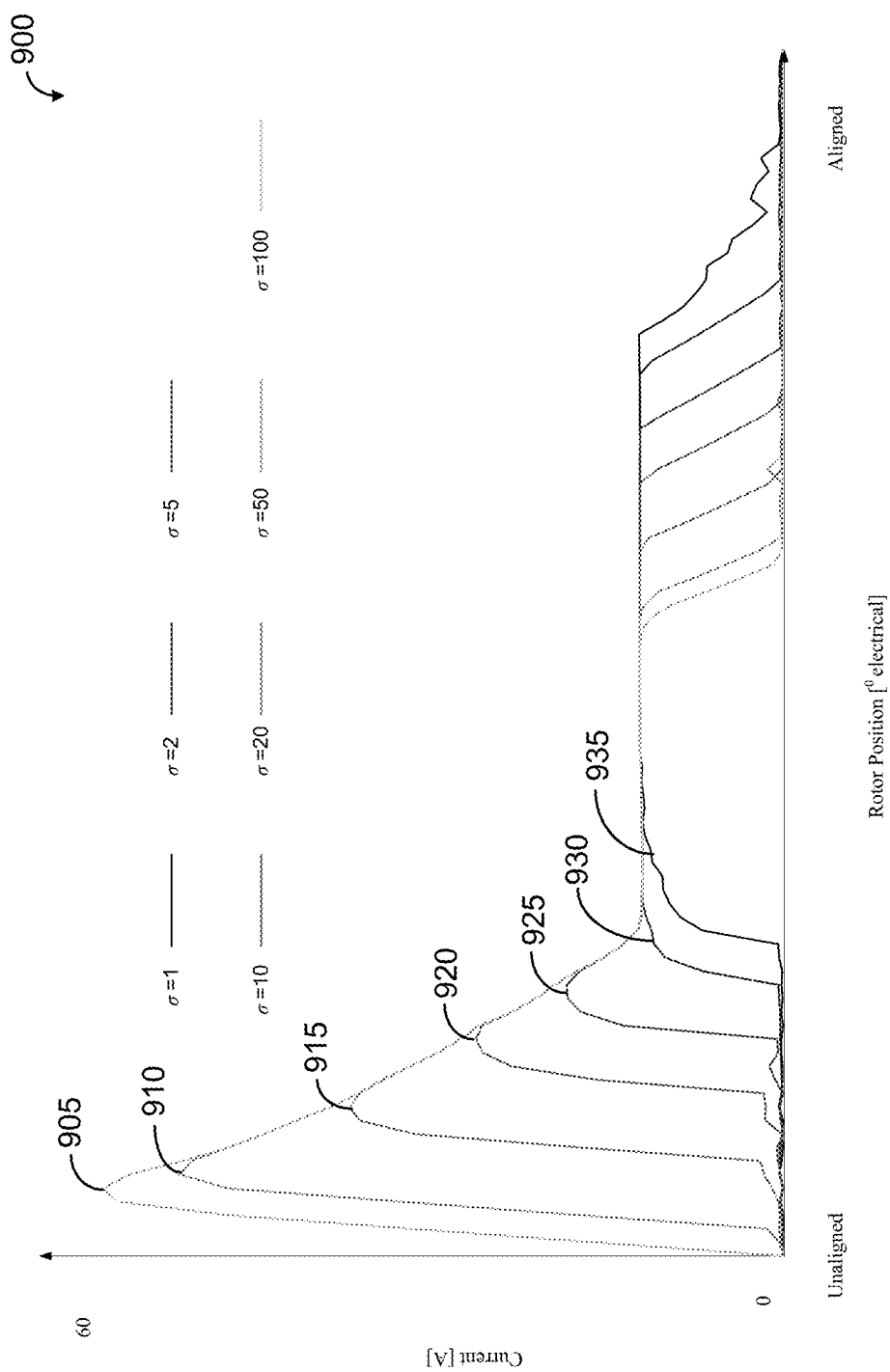
FIG. 9 shows an example plot of current reference profiles obtained from the proposed torque sharing function in accordance with an embodiment.

Reference is made to FIG. 9, which illustrates a plot 900 of example current reference profiles for a given SRM operating point. In particular, plot 900 shows current reference profiles for different weight parameters, σ, over rotor positions (in degree electrical).

Waveform 905 illustrates a current reference profile where the weight parameter, σ, is 1. Waveform 910 illustrates a current reference profile where the weight parameter is 2. In waveform 915, the weight parameter, σ, of the current reference profile is 5. Waveform 920 illustrates a current reference profile where the weight parameter is 10.

Similarly, waveform 925 illustrates a current reference profile where the weight parameter is 20, waveform 930 illustrates a current reference profile where the weight parameter is 50 and waveform 935 illustrates a current reference profile where the weight parameter is 100.

As seen in plot 900, by increasing the weight parameter, the period of excitation is advanced as the outgoing phase becomes increasingly penalized. Furthermore, the magnitude of the phase current changes in order to maintain a constant torque output based on the static torque characteristics and the constraint expressed in equation (15).

Figure 10A:
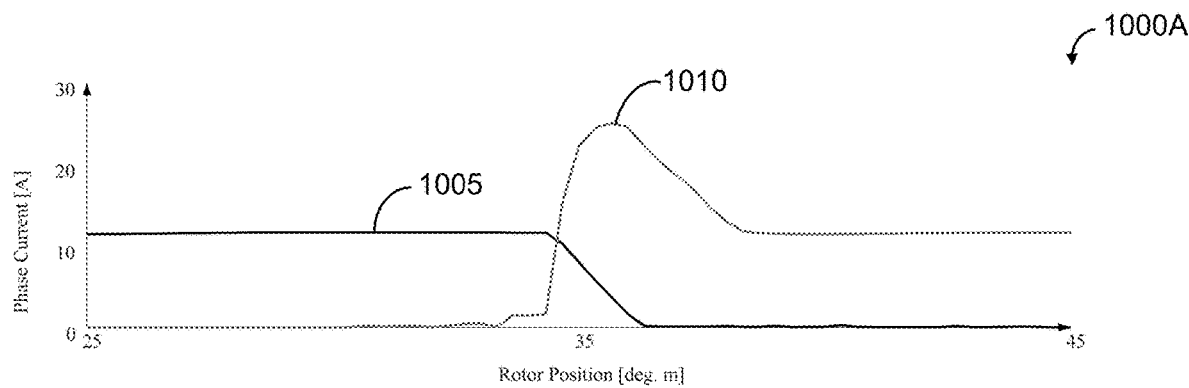
FIG. 10A shows an example plot of the phase current waveform of an example switched reluctance machine.

Reference is made to FIG. 10A, which illustrates a plot 1000A of an example current reference profile, as a function of rotor position, produced by the TSF disclosed herein. In particular, plot 1000A illustrates how the different constraints take effect at low speeds (below base speeds). As illustrated in plot 1000A, waveform 1005 shows the current reference profile for the outgoing phase. Waveform 1010 shows the current reference profile for the incoming phase.

Figure 10B:
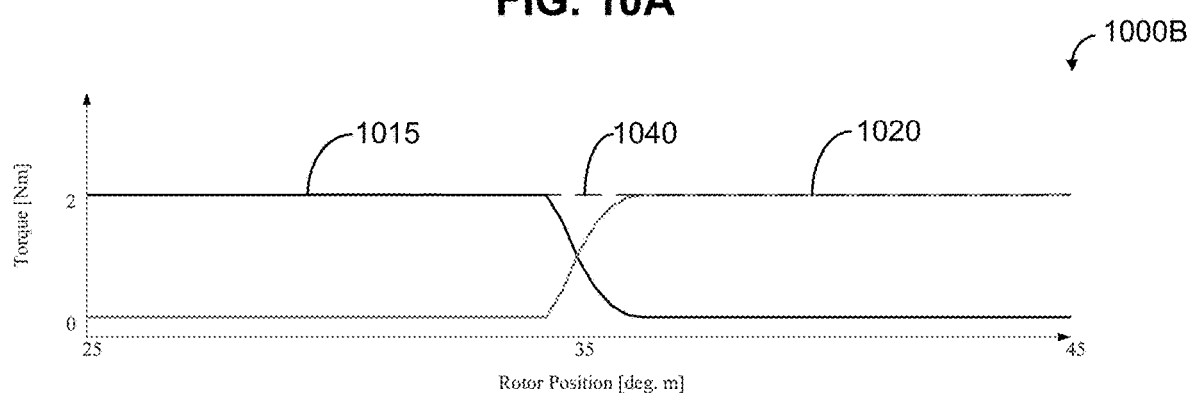
FIG. 10B shows an example plot of the torque waveform of the example switched reluctance machine of FIG. 10A.

FIG. 10B illustrates a plot 1000B of an example phase torque (Nm) as a function of rotor position. In particular, the phase torque plot 1000B is generated by interpolating the current reference profile shown in plot 1000A using static characteristics.

As illustrated in plot 1000B, waveform 1015 shows the phase torque for the outgoing phase. Waveform 1020 shows the phase torque for the incoming phase. Plot 1000B also illustrates that the constraint expressed in equation (15) has been met. By summing the phase torques of waveforms 1015 and 1020, it may be seen that the resulting torque is constant (shown in "dashed" lines) 1040.

Figure 10C:
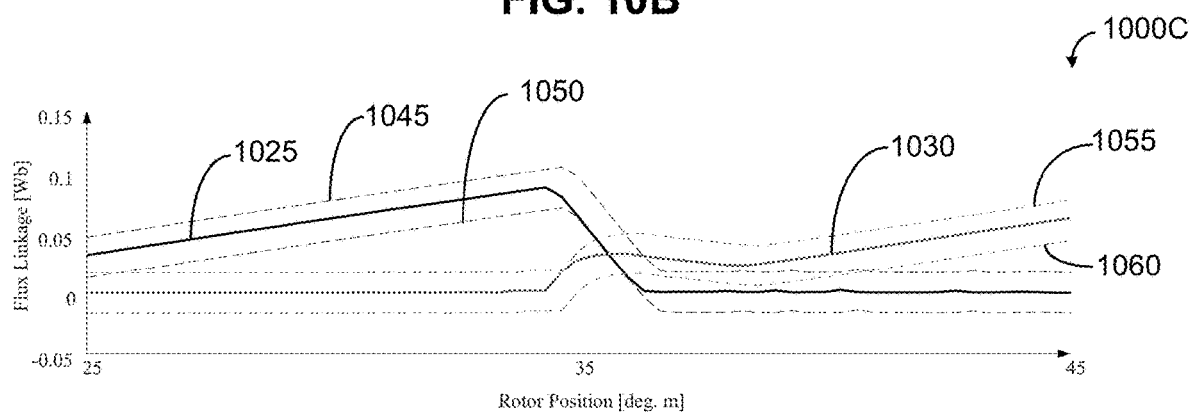
FIG. 10C shows an example plot of the flux linkage waveform of the example switched reluctance machine of FIG. 10A.

FIG. 10C illustrates a plot 1000C of an example flux linkage (Wb) as a function of rotor position. In particular, the flux linkage plot 1000C is generated by interpolating the current reference profile shown in plot 1000A using static characteristics.

As illustrated in plot 1000C, waveform 1025 shows the flux linkage for the outgoing phase. Waveform 1030 shows the flux linkage for the incoming phase. Also shown in plot 1000C is waveform 1045 showing the maximum possible flux linkage for the outgoing phase, and waveform 1050 showing the minimum possible flux linkage for the outgoing phase. Similarly, plot 1000C also shows a waveform 1055 representing the maximum possible flux linkage for the incoming phase, and waveform 1060 representing the minimum possible flux linkage for the incoming phase.

Accordingly, plot 1000C illustrates that the flux linkages are within the bounds set by calculating the maximum and minimum possible values from constraint (16). The bounds on the flux linkage are calculated based on the current time-step flux, assuming full dc-link voltage is applied to the phase for the subsequent time step.

The waveform 1040 shows that the torque is constant if the current is successfully tracked. Similarly, waveforms 1045, 1050 and waveforms 1055, 1060, representing the maximum and minimum flux linkages for the outgoing and incoming phases, show that the current may be tracked without error.

FIG. 10C also illustrates that at low speeds, only when the phase is demagnetizing, the rate of change of phase flux linkage is at its allowed minimum.

Figure 11A:
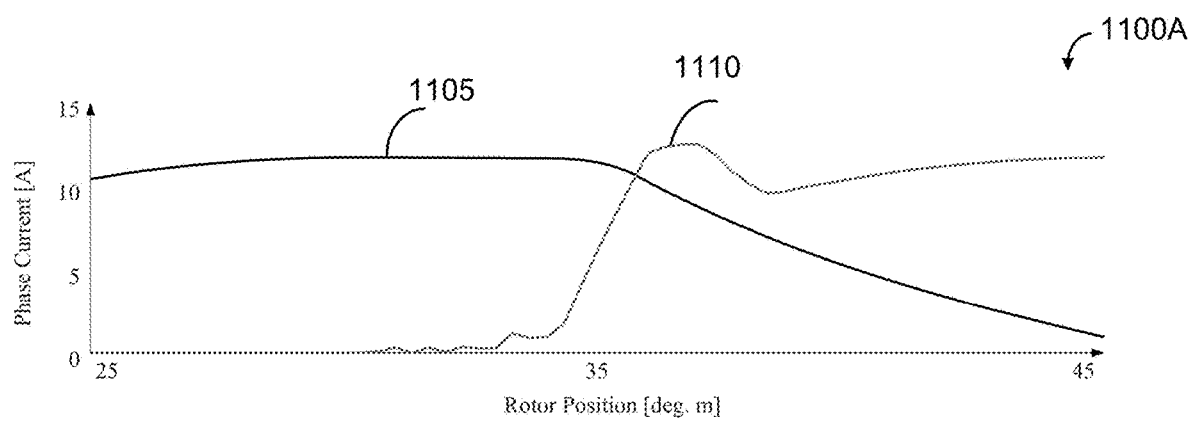
FIG. 11A shows an example plot of the phase current waveform of an example switched reluctance machine.
Figure 11B:
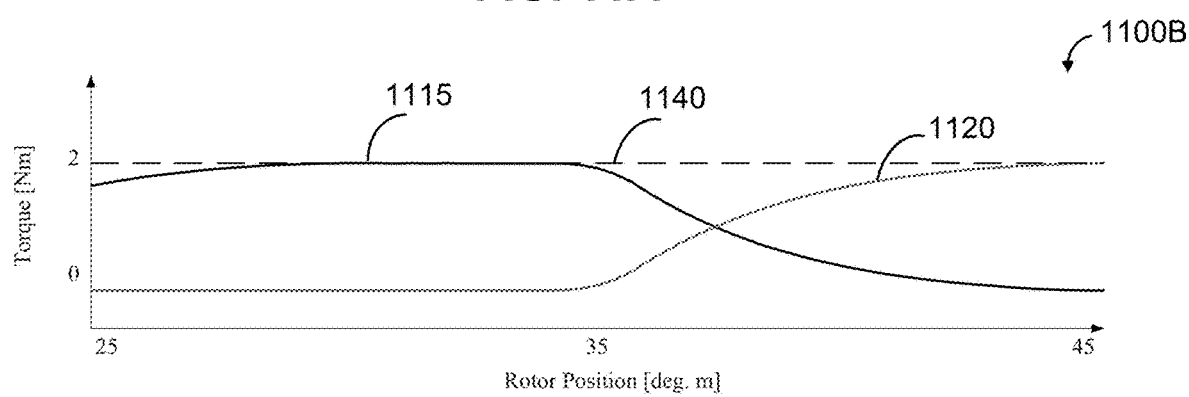
FIG. 11B shows an example plot of the torque waveform of the example switched reluctance machine of FIG. 11A.
Figure 11C:
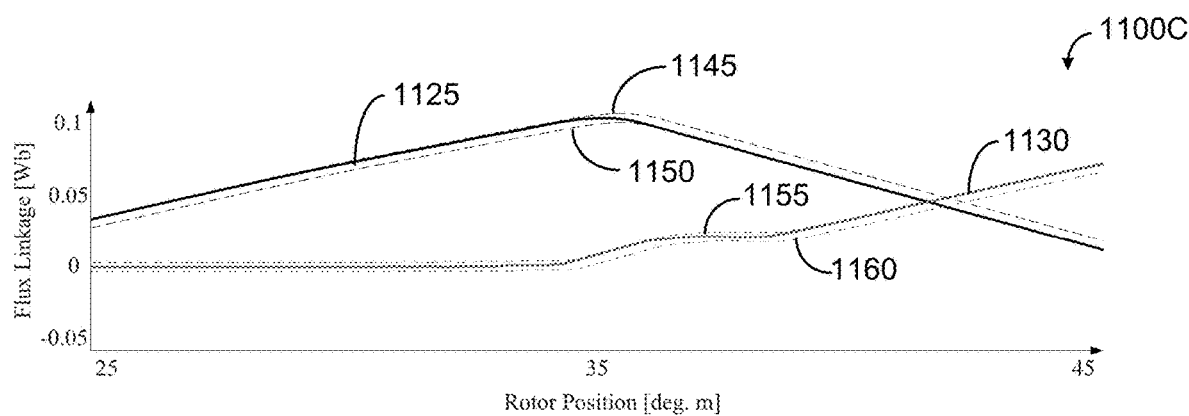
FIG. 11C shows an example plot of the flux linkage waveform of the example switched reluctance machine of FIG. 11A.

Reference is next made to FIGS. 11A-11C, which illustrate phase current, torque and flux linkage plots 1100A, 1100B, 1100C, respectively, produced by the TSF disclosed herein at the base speed (or high speed). This is in contrast to the plots of FIGS. 10A-10C, which relate to below base or low speeds.

Reference is made to FIG. 11A, which illustrates a plot 1100A of an example current reference profile, as a function of rotor position, produced by the TSF disclosed herein. As illustrated in plot 1100A, waveform 1105 shows the current reference profile for the outgoing phase. Waveform 1110 shows the current reference profile for the incoming phase.

FIG. 11B illustrates a plot 1100B of an example phase torque (Nm) as a function of rotor position. In particular, the phase torque plot 1100B is generated by interpolating the current reference profile shown in plot 1100A using static characteristics.

As illustrated in plot 1100B, waveform 1115 shows the phase torque for the outgoing phase. Waveform 1120 shows the phase torque for the incoming phase. Plot 1100B also illustrates that the constraint expressed in equation (15) has been met. By summing the phase torques of waveforms 1115 and 1120, it may be seen that the resulting torque is constant (shown in "dashed" lines) 1140.

FIG. 11C illustrates a plot 1100C of an example flux linkage (Wb) as a function of rotor position. In particular, the flux linkage plot 1100C is generated by interpolating the current reference profile shown in plot 1100A using static characteristics.

As illustrated in plot 1100C, waveform 1125 shows the flux linkage for the outgoing phase. Waveform 1130 shows the flux linkage for the incoming phase. Also shown in plot 1100C is waveform 1145 showing the maximum possible flux linkage for the outgoing phase, and waveform 1150 showing the minimum possible flux linkage for the outgoing phase. Similarly, plot 1100C also shows a waveform 1155 representing the maximum possible flux linkage for the incoming phase, and waveform 1160 representing the minimum possible flux linkage for the incoming phase.

In FIG. 11C, it is shown that the phase flux linkage is constrained for a higher percentage of the conduction period. This is because at the base speed, the current rate of change is limited by the induced voltage in the system. Furthermore, FIG. 11C also shows that the phase flux linkage is at the maximum allowed values calculated by the constraints expressed in equation (16) during the magnetization period, which means that the phase must supply full dc-link voltage to ensure the current is tracked. During demagnetization, full negative dc-link voltage must be supplied.

Figure 12:
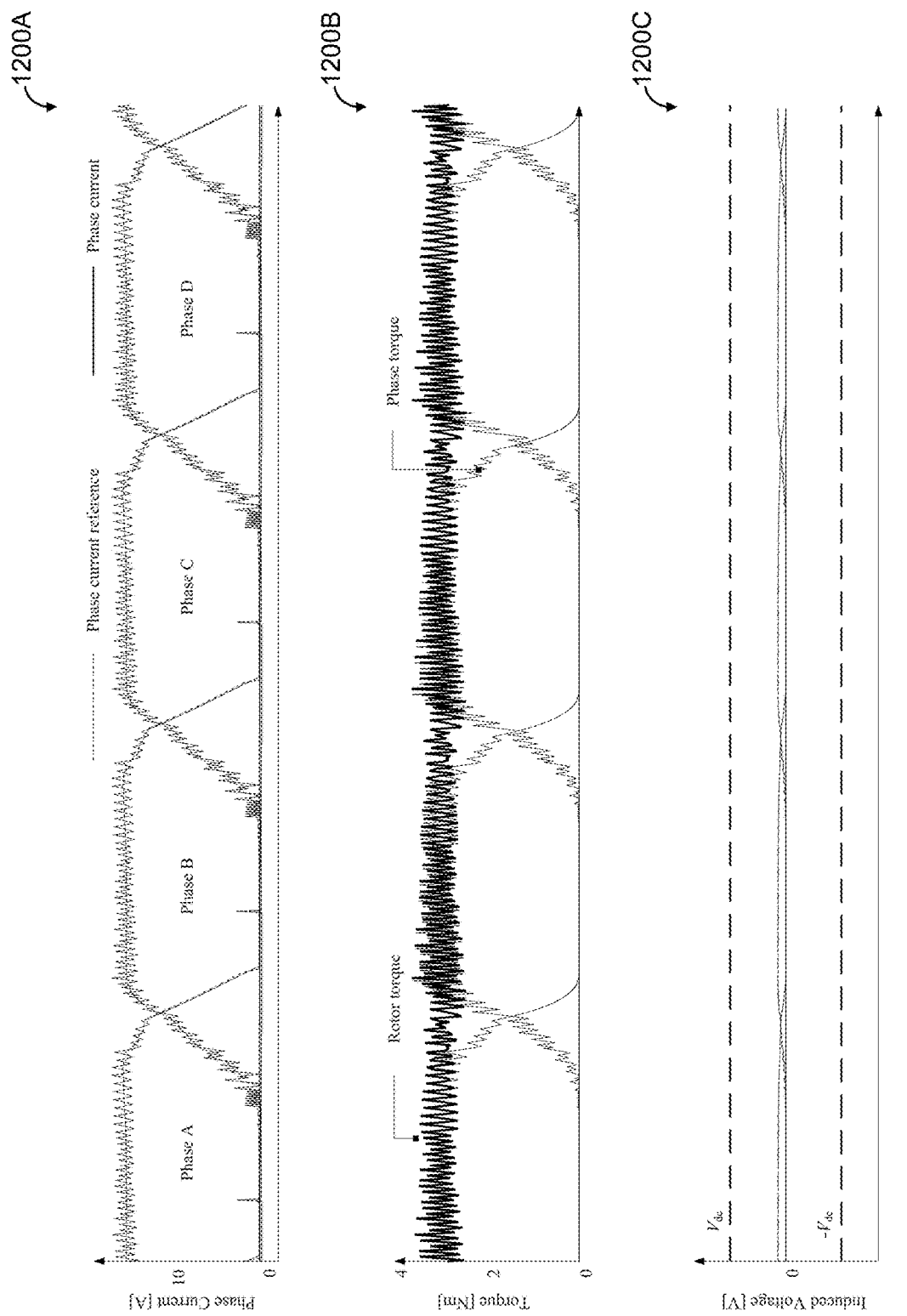
FIG. 12 shows example simulation plots associated with a switched reluctance machine at 1000 RPM, 3 Nm and weight parameter of 0.72 with the proposed torque sharing function.
Figure 13:
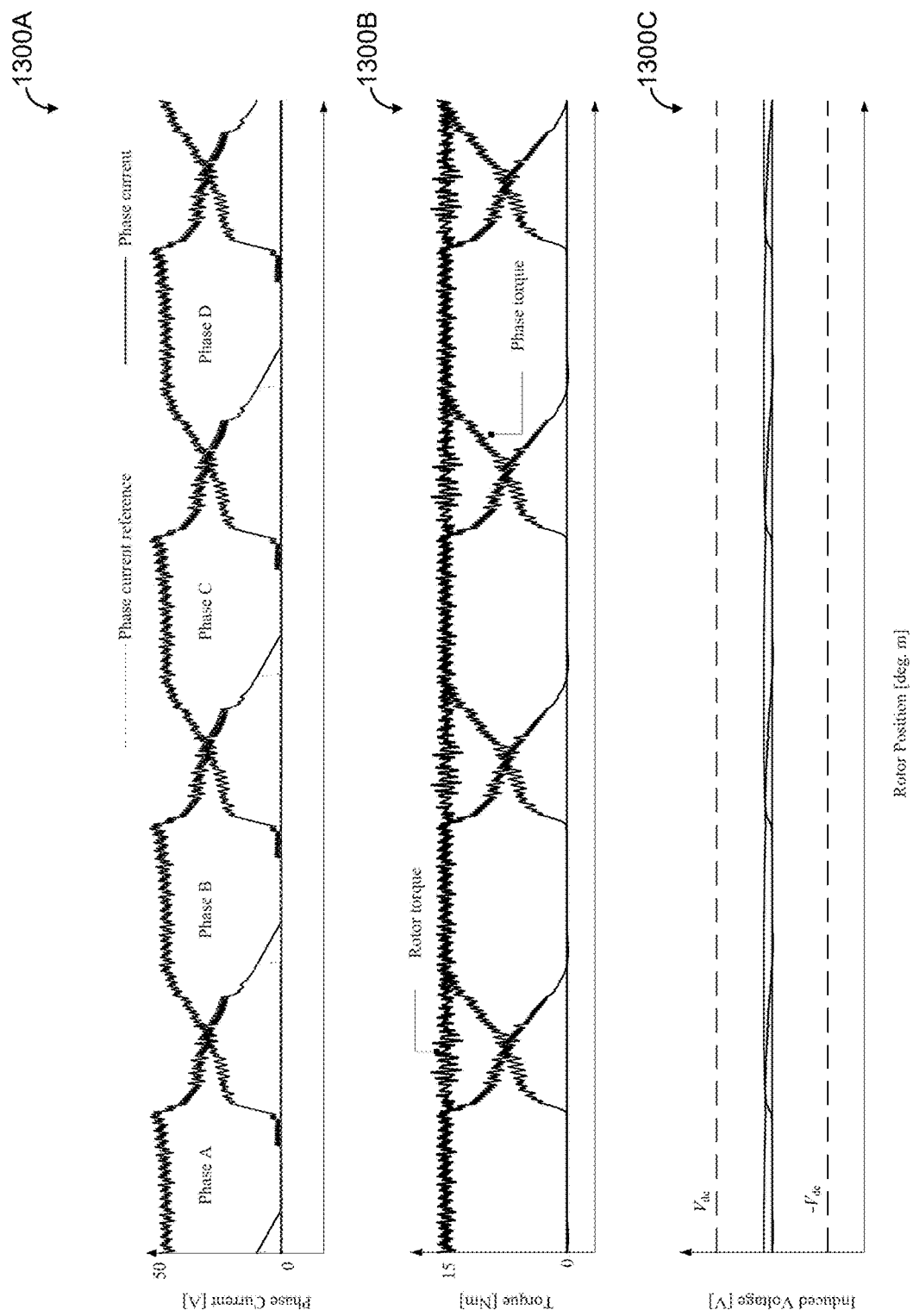
FIG. 13 shows example simulation plots associated with a switched reluctance machine at 1000 RPM, 15 Nm and weight parameter of 0.72 with the proposed torque sharing function.
Figure 14:
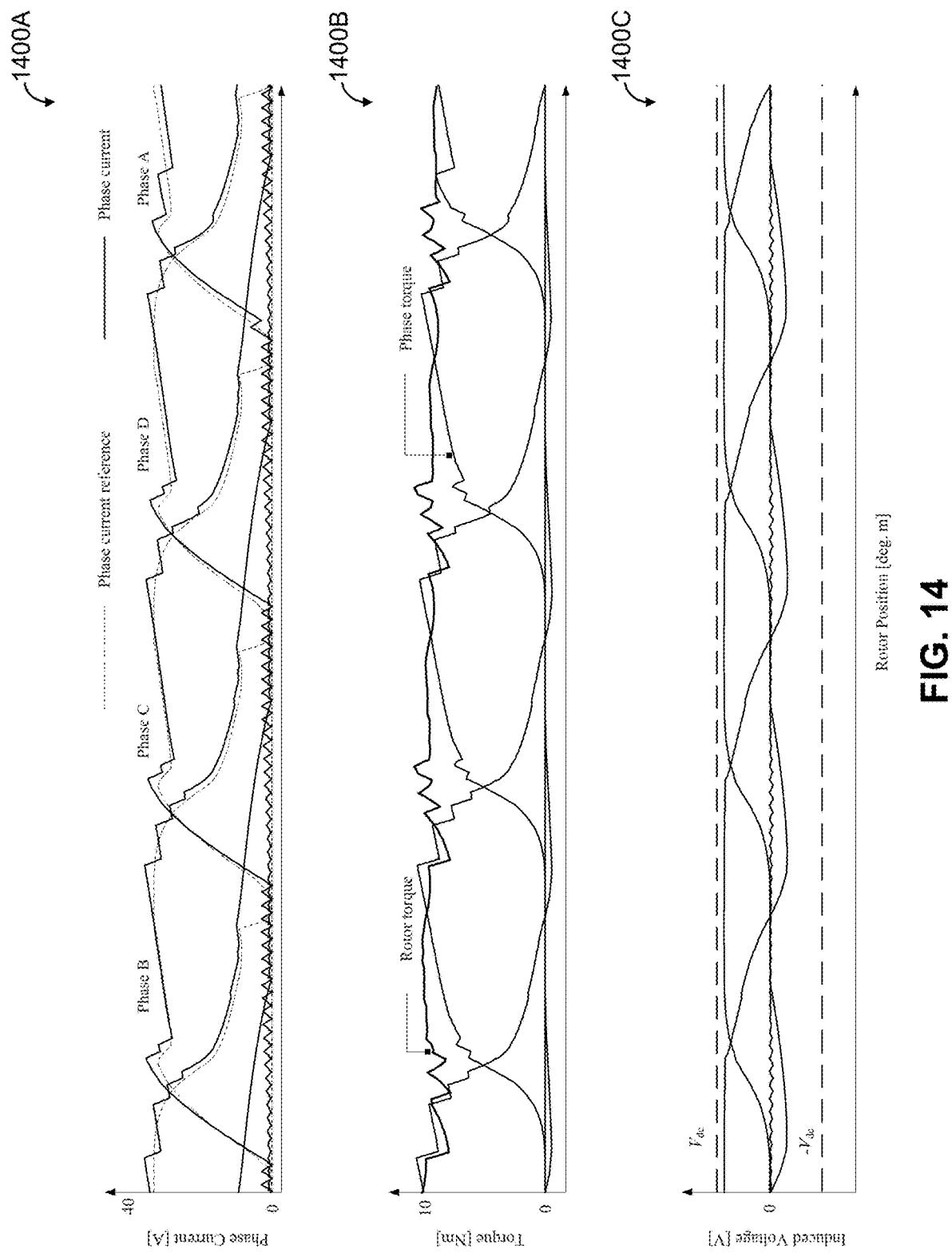
FIG. 14 shows example simulation plots associated with a switched reluctance machine at 6000 RPM, 10 Nm and weight parameter of 12.55 with the proposed torque sharing function.
Figure 15:
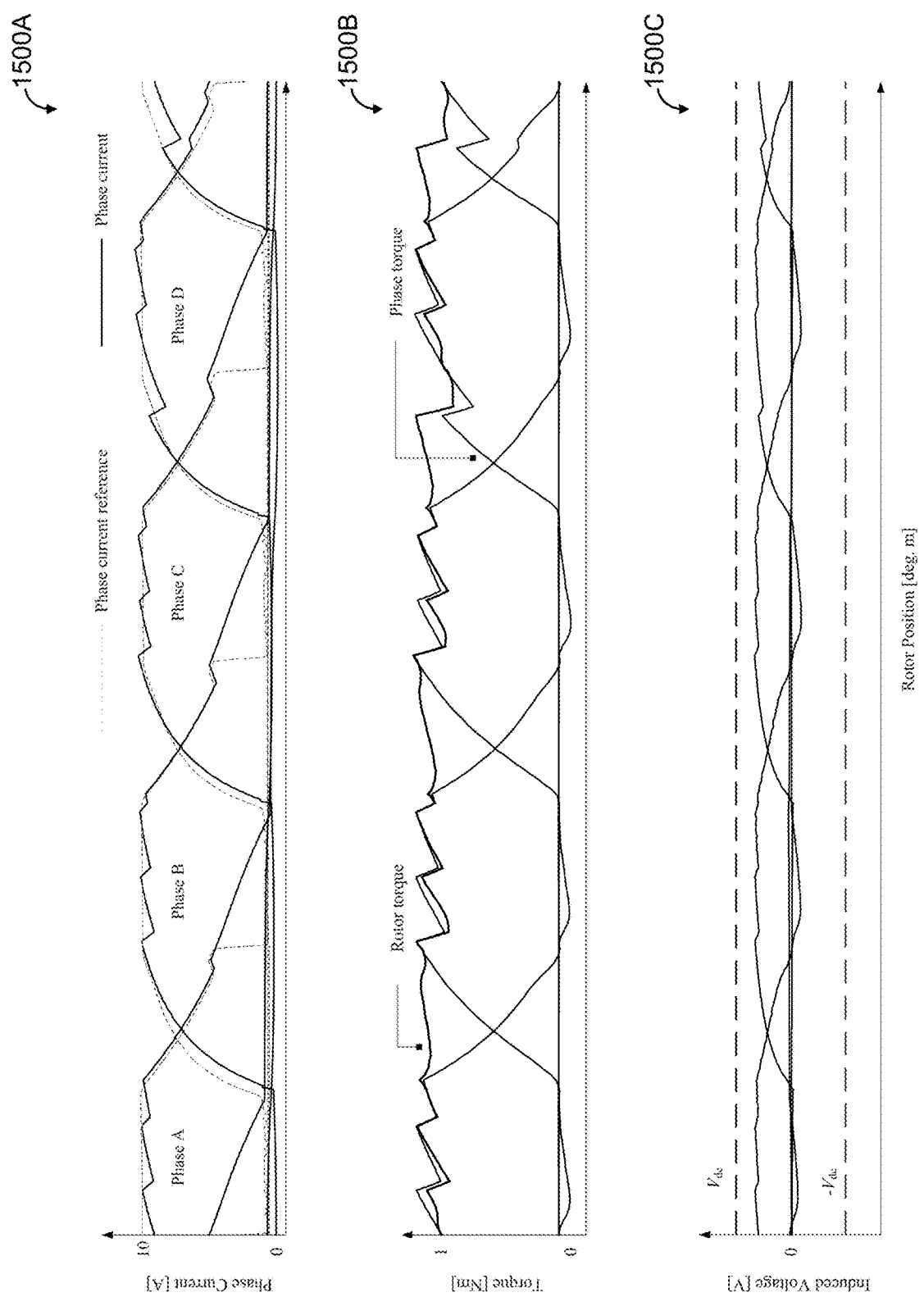
FIG. 15 shows example simulation plots associated with a switched reluctance machine at 8000 RPM, 1 Nm and weight parameter of 1.91 with the proposed torque sharing function.

Reference is next made to FIGS. 12-15, which illustrates examples of a) phase current and reference, b) torque and c) induced voltage plots based on simulation of different operating conditions of the proposed TSF disclosed herein. FIG. 12 illustrates simulation results based on operating conditions of low speed and low torque, FIG. 13 illustrates simulation results based on operating conditions of low speed and high torque, FIG. 14 illustrates simulation results based on operating conditions of high (or base) speed and high torque, and FIG. 15 illustrates simulation results based on operating conditions of high speed and low torque.

In particular, FIG. 12 illustrates phase current and reference plots 1200A, torque plots 1200B and induced voltage plots 1200C, as a function of rotor position, resulting from a dynamic simulation of the proposed TSF at 1000 RPM, 3 Nm torque command, and weight parameter, σ, of 0.72.

FIG. 13 similarly illustrates phase current and reference plots 1300A, torque plots 1300B and induced voltage plots 1300C, as a function of rotor position, resulting from a dynamic simulation of the proposed TSF at 1000 RPM, 15 Nm torque command and weight parameter of 0.58.

FIG. 14 illustrates phase current and reference plots 1400A, torque plots 1400B and induced voltage plots 1400C, as a function of rotor position, resulting from a dynamic simulation of the proposed TSF at 6000 RPM, 10 Nm torque command, and weight parameter of 12.55.

FIG. 15 illustrates phase current and reference plots 1500A, torque plots 1500B and induced voltage plots 1500C, as a function of rotor position, resulting from a dynamic simulation of the proposed TSF at 8000 RPM, 1 Nm torque command, and weight parameter of 1.91.

As illustrated in the plots of FIG. 14, at 6000 RPM, 10 Nm torque command, the torque ripple of the proposed TSF is 0.42 Nm rms, which is about 0.5 Nm rms reduction compared to simulation results of FIG. 7 at plot 700B at the same operating point. In addition, compared to the current reference shown in FIG. 7A, it may be seen that the rate of change of the incoming phase current in plot 1400A is much lower. This reduces the tracking error, thus improving torque ripple.

As illustrated in the plots of FIG. 15, at 8000 RPM, 1 Nm torque command, torque ripple of 0.06 Nm rms has been achieved by the proposed TSF. This demonstrates that the TSF may be effective at high speeds as well, while it is under the condition that current tracking is achievable.

Figure 16:
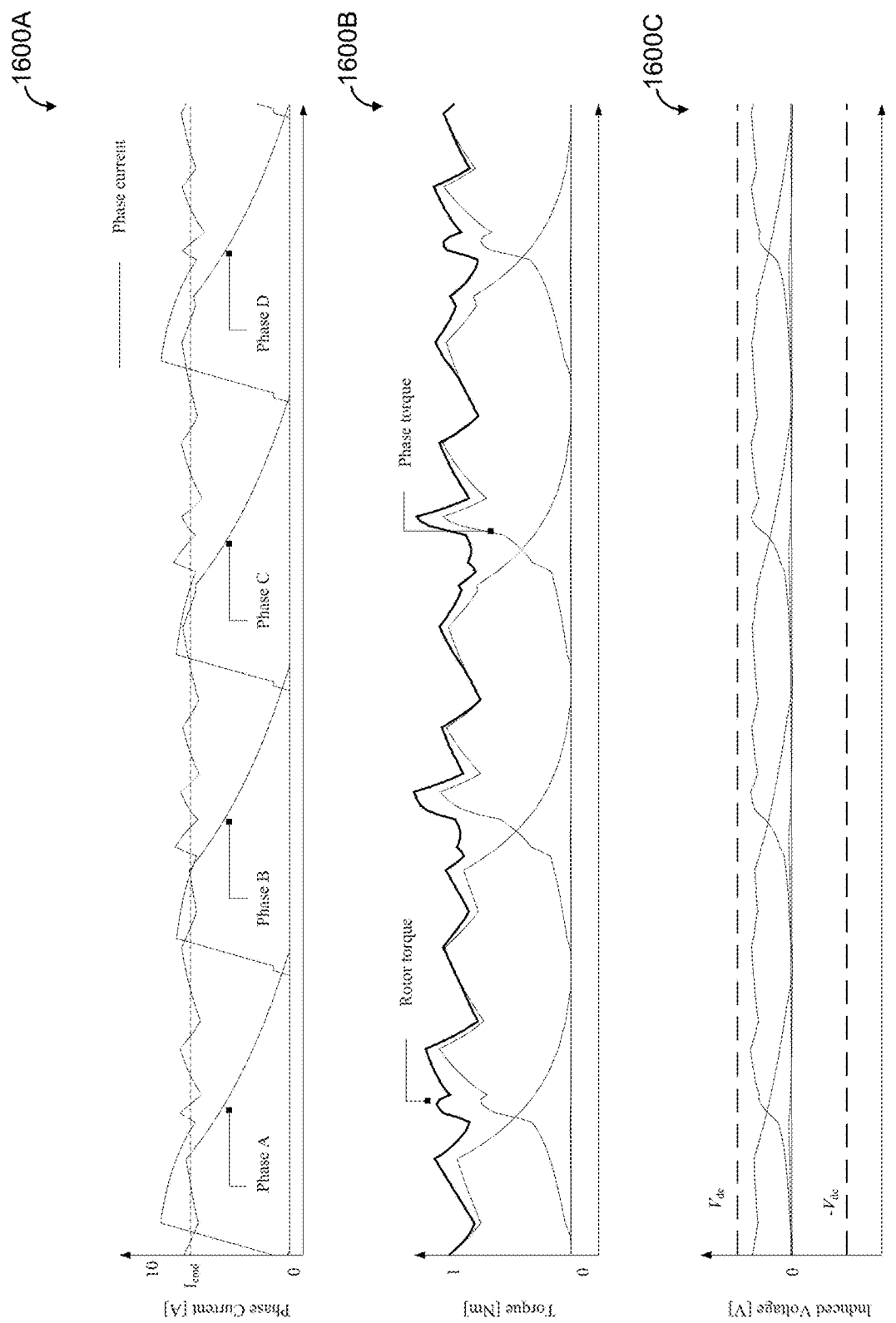
FIG. 16 shows example simulations plots associated with an example switched reluctance machine at 8000 RPM using conventional conduction angle controls.

Reference is made to FIG. 16, which illustrates an example of phase current and reference plots 1600A, torque plots 1600B and induced voltage plots 1600C, as a function of rotor position, resulting from a dynamic simulation of the proposed TSF at 8000 RPM using conventional conduction angle controls when the conduction angles are set at $\theta_{on}$=−2°, $\theta_{off}$=121°. The current command, $I_{cmd}$ is set at 7.79 A to achieve 1 Nm torque output for comparison against the proposed TSF at this operating point.

In the plots of FIG. 16, the dynamic performance of the SRM using conduction angle control, in which the conduction angles have been optimized at this speed using torque ripple and average torque as objectives, is illustrated. The peak current is adjusted so that the average torque is comparable to that produced by the TSF. From this simulation, a torque ripple of 0.06 Nm rms has also been achieved using conduction angle control. However, the wider conduction period requires advanced current excitation, which results in a current of 5.89 A rms. Using the TSF, the current is 4.18 A rms, which suggests that by shaping the current, a more optimal current waveform can be achieved in reducing copper losses while maintaining the same torque output.

Figure 17:
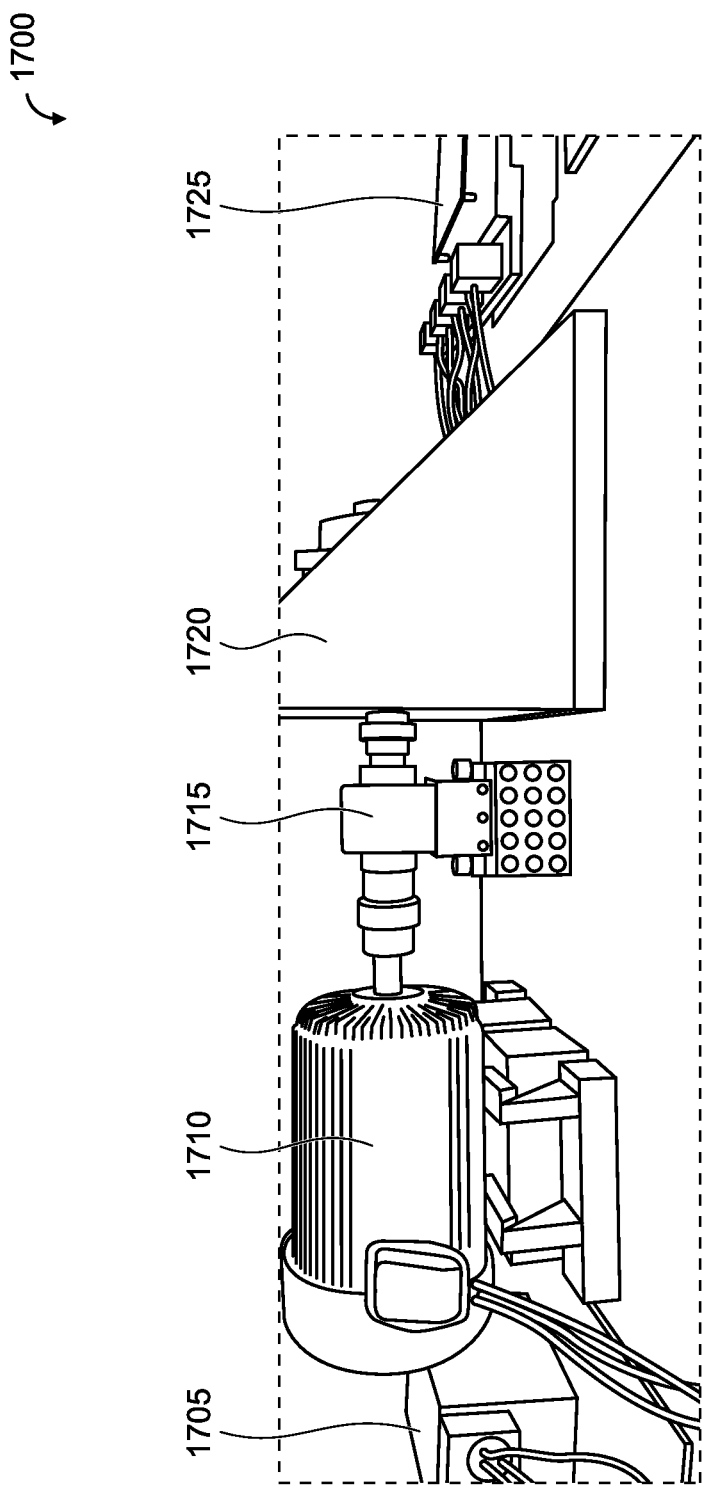
FIG. 17 shows a SRM drive assembly according to an example.

Reference is made to FIG. 17, which illustrates an example of a SRM drive assembly 1700 that may be used to test the proposed TSF experimentally. SRM drive assembly 1700 comprises an induction machine drive 1705, an induction machine 1710, a torque transducer 1715, a SRM 1720 and a SRM drive 1725, connected to each other in that order.

In the SRM drive assembly 1700, the SRM 1720 is a four phase, 8-6 SRM, with eight stator poles and six rotor poles, with a base speed of 6000 RPM. As illustrated, the SRM drive assembly 1700 includes an induction machine 1710 to load the SRM 1720. In addition, the shaft is connected using a torque transducer 1715 which measures the shaft torque directly.

Figure 18:
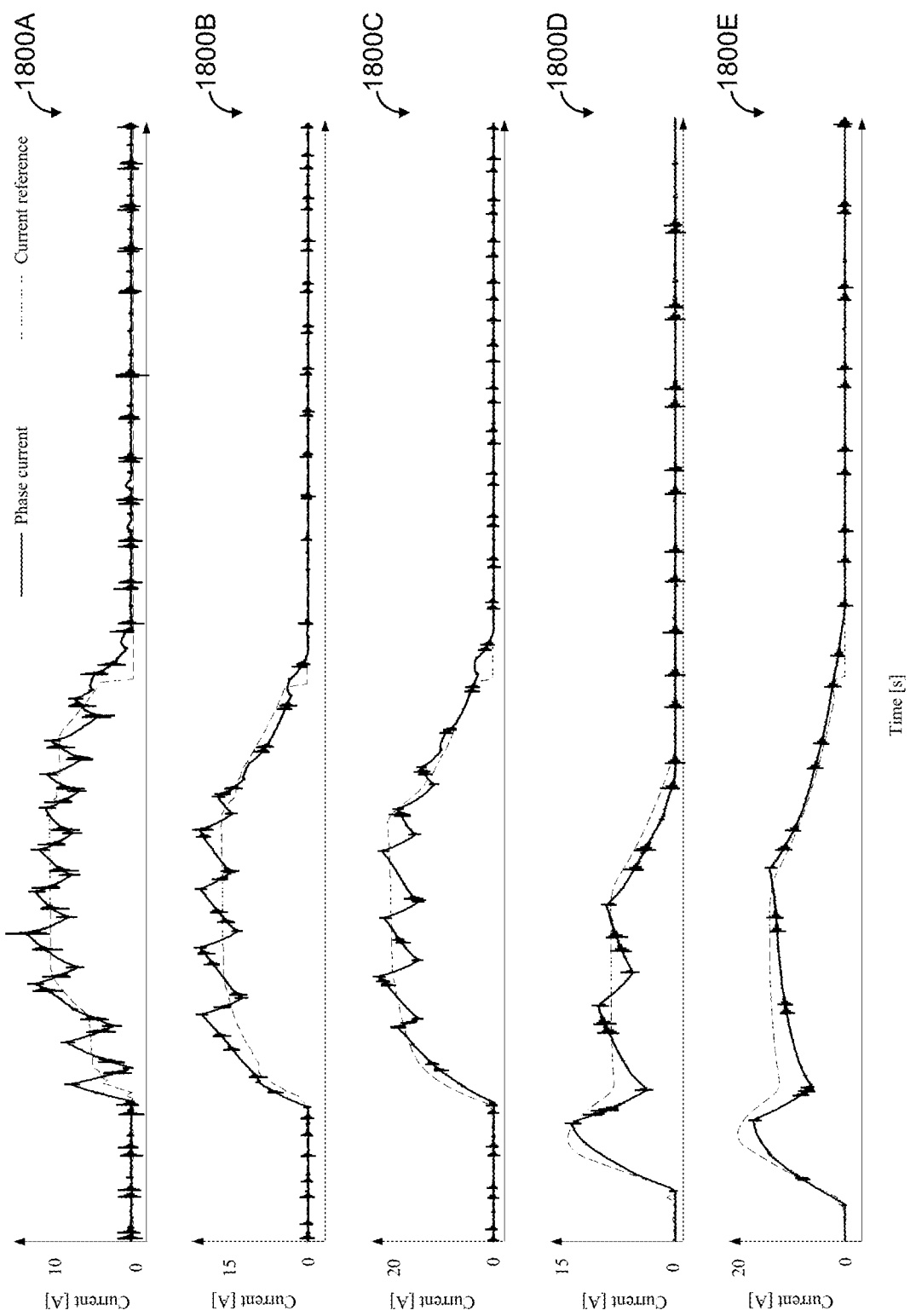
FIG. 18 shows example experimental plots associated with an example switched reluctance machine at different speed and torque configurations.

FIG. 18 illustrates plots from experimental validation of the TSF at different speed, torque and weight parameter conditions of the SRM, such as SRM of FIG. 17. Plot 1800A illustrates the current profile of the SRM from the experimental simulation of the TSF of FIG. 17 which the speed and torque configurations of 3000 RPM and 1 Nm respectively. The weight parameter used for this plot is 0.89.

Plot 1800B illustrates the current profile of the SRM from the experimental simulation of the TSF of FIG. 17 which the speed and torque configurations of 3000 RPM and 3 Nm respectively. The weight parameter used for this plot is 0.91.

Plot 1800C illustrates the current profile of the SRM from the experimental simulation of the TSF of FIG. 17 which the speed and torque configurations of 3000 RPM and 5 Nm respectively. The weight parameter used for this plot is 1.01.

Plot 1800D illustrates the current profile of the SRM from the experimental simulation of the TSF of FIG. 17 which the speed and torque configurations of 6000 RPM and 1 Nm respectively. The weight parameter used for this plot is 19.9.

Plot 1800E illustrates the current profile of the SRM from the experimental simulation of the TSF of FIG. 17 which the speed and torque configurations of 6000 RPM and 3 Nm respectively. The weight parameter used for this plot is 19.9.

Plots 1800A-1800E show the measured current profiles against current reference values. The average torque is obtained and shown to be within 15% of the torque command. In each case, it may be seen that the rms current matches closely to that of the reference, which suggests that good current tracking has been achieved. The average torque is also within 15% of the torque command in each case.

The rms current and average torque at 3000 RPM and 6000 RPM are shown in Table 1 below.

TABLE 1

Experimentally observed values for rms current and average torque at various operating points

| Speed | $T_{cmd}$ [Nm] | $I_{rms}$ (reference) [A, rms] | $I_{rms}$ (measured) [A, rms] | $T_{avg}$ [Nm] | Torque error [%] |
|---|---|---|---|---|---|
| 3000 | 1 | 4.33 | 4.33 | 1.12 | 12.0 |
| 3000 | 3 | 7.29 | 7.21 | 3.45 | 15.0 |
| 3000 | 5 | 9.40 | 9.02 | 5.68 | 13.6 |
| 6000 | 1 | 5.01 | 4.97 | 1.15 | 15.0 |
| 6000 | 3 | 8.34 | 7.87 | 3.22 | 7.3 |

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

The invention claimed is:

1. A switched reluctance machine comprising:
an axially extending shaft;
an axially extending rotor mounted to the shaft, the rotor having a plurality of salient rotor poles;
an axially extending stator disposed coaxially and concentrically with the rotor, the stator having a plurality of salient stator poles protruding radially from the stator towards the rotor poles;
a plurality of electrical coils wound about the stator poles, the plurality of electrical coils including a plurality of separate phase coils defining a plurality of phases of the switched reluctance machine; and
a control system operatively coupled to a current controller for the switched reluctance machine, the control system being configured to generate a unique set of current reference profiles by minimizing an objective function while satisfying at least one constraint function, wherein the objective function comprises a first reference current and a second reference current, the first reference current for an outgoing phase at a present rotor position of the switched reluctance machine, the second reference current for an incoming phase at the present rotor position of the switched reluctance machine, the control system is configured to provide the unique set of current reference profiles to the current controller, and the current controller is configured to, for each phase coil, apply a phase current corresponding to a respective current reference profile to that phase coil to control the switched reluctance machine.

2. The switched reluctance machine of claim 1, wherein the control system is configured to receive a predetermined value of a weight parameter, σ.

3. The switched reluctance machine of claim 2, wherein the objective function, J, comprises:

$$J = i_k^2 + \sigma i_{k-1}^2,$$

wherein:
$i_{k-1}$ represents the first reference current for the outgoing phase at the present rotor position of the switched reluctance machine,
$i_k$ represents the second reference current for the incoming phase at the present rotor position of the switched reluctance machine; and
σ represents a predetermined value of a weight parameter.

4. The switched reluctance machine of claim 1, wherein the at least one constraint function comprises:

$$0 \leq i_k \leq i_{rated}$$

$$0 \leq i_{k-1} \leq i_{rated},$$

wherein:
$i_{k-1}$ represents the first reference current for the outgoing phase at the present rotor position of the switched reluctance machine,
$i_k$ represents the second reference current for the incoming phase at the present rotor position of the switched reluctance machine; and
$i_{rated}$ represents an allowable peak current for the switched reluctance machine.

5. The switched reluctance machine of claim 1, wherein the at least one constraint function comprises:

$$T_{ref} = T(i_k, \theta_k) + T(i_{k-1}, \theta_{k-1}),$$

wherein:
$T_{ref}$ represents a reference torque for the switched reluctance machine,
$T(i_{k-1}, \theta_{k-1})$ represents a phase torque for the switched reluctance machine in the outgoing phase; and
$T(i_k, \theta_k)$ represents a phase torque of the switched reluctance machine in the incoming phase.

6. The switched reluctance machine of claim 1, wherein the at least one constraint function comprises:

$$\frac{\Delta \lambda(i_k, \theta_k)}{\Delta t} \leq V_{DC} - i_k R$$

$$\frac{\Delta \lambda(i_k, \theta_k)}{\Delta t} \geq -V_{DC} + i_k R$$

$$\frac{\Delta \lambda(i_{k-1}, \theta_{k-1})}{\Delta t} \leq V_{DC} - i_{k-1} R$$

$$\frac{\Delta \lambda(i_{k-1}, \theta_{k-1})}{\Delta t} \geq -V_{DC} + i_{k-1} R$$

wherein:
$V_{DC}$ represents a dc-link voltage supplied to the switched reluctance machine,
R represents a phase resistance,
λ represents a phase flux linkage,
Δt represents the sampling period,
$i_{k-1}$ represents the first reference current for the outgoing phase of the switched reluctance machine,
$i_k$ represents the second reference current for the incoming phase of the switched reluctance machine;
$\theta_{k-1}$ represents a rotor position for the outgoing phase of the switched reluctance machine, and
$\theta_k$ represents a rotor position for the incoming phase of the switched reluctance machine.

7. The switched reluctance machine of claim 1, wherein the control system is configured to generate the unique set of current reference profiles over a span of one electrical period.

8. The switched reluctance machine of claim 7, wherein the control system is configured to store the unique set of current reference profiles as a function of position of the rotor over the span of one electrical period.

9. A method of controlling a switched reluctance machine, the method comprising:
providing the switched reluctance machine, the switched reluctance machine comprising:
an axially extending shaft;
an axially extending rotor mounted to the shaft, the rotor having a plurality of salient rotor poles;
an axially extending stator disposed coaxially and concentrically with the rotor, the stator having a plurality of salient stator poles protruding radially from the stator towards the rotor poles; and
a plurality of electrical coils wound about the stator poles, the plurality of electrical coils including a plurality of separate phase coils defining a plurality of phases of the switched reluctance machine;
providing a control system operatively coupled to a current controller for the switched reluctance machine, the control system being configured to generate a unique set of current reference profiles by minimizing an objective function while satisfying at least one constraint function, wherein the objective function comprises a first reference current and a second reference current, the first reference current for an outgoing phase at a present rotor position of the switched reluctance machine, the second reference current for an incoming phase at the present rotor position of the switched reluctance machine; and
operating the switched reluctance machine based on the unique set of current profiles generated by the control system by, for each phase coil, applying a phase current corresponding to a respective current reference profile to that phase coil.

10. The method of claim 9, further comprising:
receiving a predetermined value of a weight parameter, $\sigma$, by the control system to generate the objective function.

11. The method of claim 10, further comprising:
generating, by the control system, the objective function based on:

$$J = i_k^2 + \sigma i_{k-1}^2,$$

wherein:
$i_{k-1}$ represents the first reference current for the outgoing phase at the present rotor position of the switched reluctance machine,
$i_k$ represents the second reference current for the incoming phase at the present rotor position of the switched reluctance machine; and
$\sigma$ represents a predetermined value of a weight parameter.

12. The method of claim 9, further comprising:
generating, by the control system, the at least one constraint function based on:

$$0 \leq i_k \leq i_{rated}$$

$$0 \leq i_{k-1} \leq i_{rated},$$

wherein:
$i_{k-1}$ represents the first reference current for the outgoing phase at the present rotor position of the switched reluctance machine,
$i_k$ represents the second reference current for the incoming phase at the present rotor position of the switched reluctance machine; and
$i_{rated}$ represents an allowable peak current for the switched reluctance machine.

13. The method of claim 9, further comprising:
generating, by the control system, the at least one constraint function based on:

$$T_{ref} = T(i_k, \theta_k) + T(i_{k-1}, \theta_{k-1}),$$

wherein:
$T_{ref}$ represents a reference torque for the switched reluctance machine,
$T(i_{k-1}, \theta_{k-1})$ represents a phase torque for the switched reluctance machine in the outgoing phase; and
$T(i_k, \theta_k)$ represents a phase torque of the switched reluctance machine in the incoming phase.

14. The method of claim 9, further comprising:
generating, by the control system, the at least one constraint function based on:

$$\frac{\Delta \lambda(i_k, \theta_k)}{\Delta t} \leq V_{DC} - i_k R$$

$$\frac{\Delta \lambda(i_k, \theta_k)}{\Delta t} \geq -V_{DC} + i_k R$$

$$\frac{\Delta \lambda(i_{k-1}, \theta_{k-1})}{\Delta t} \leq V_{DC} - i_{k-1} R$$

$$\frac{\Delta \lambda(i_{k-1}, \theta_{k-1})}{\Delta t} \geq -V_{DC} + i_{k-1} R$$

wherein:
$V_{DC}$ represents a dc-link voltage supplied to the switched reluctance machine,
R represents a phase resistance,
$\lambda$ represents a phase flux linkage,
$\Delta t$ represents the sampling period,
$i_{k-1}$ represents the first reference current for the outgoing phase of the switched reluctance machine,
$i_k$ represents the second reference current for the incoming phase of the switched reluctance machine;
$\theta_{k-1}$ represents a rotor position for the outgoing phase of the switched reluctance machine, and
$\theta_k$ represents a rotor position for the incoming phase of the switched reluctance machine.

15. A method of controlling a switched reluctance machine, the switched reluctance machine comprising an axially extending shaft, an axially extending rotor mounted to the shaft, an axially extending stator disposed coaxially and concentrically with the rotor, wherein the rotor has a plurality of salient rotor poles, and the stator has a plurality of salient stator poles protruding radially from the stator towards the rotor poles, and a plurality of electrical coils wound about the stator poles, the plurality of electrical coils including a plurality of separate phase coils defining a plurality of phases of the switched reluctance machine, the method comprising:
generating, by a control system operatively coupled to a current controller for the switched reluctance machine, a unique set of current reference profiles by minimizing an objective function while satisfying at least one constraint function, wherein the objective function comprises a first reference current and a second reference current, the first reference current for an outgoing phase at a present rotor position of the switched reluctance machine, the second reference current for an incoming phase at the present rotor position of the switched reluctance machine; and
operating the switched reluctance machine based on the unique set of current profiles generated by the control system by, for each phase coil, applying a phase current corresponding to a respective current reference profile to that phase coil.

16. The method of claim 15, further comprising:
receiving a predetermined value of a weight parameter, σ, by the control system to generate the objective function.

17. The method of claim 16, further comprising:
generating, by the control system, the objective function based on:

$$J = i_k^2 + \sigma i_{k-1}^2,$$

wherein:
$i_{k-1}$ represents the first reference current for the outgoing phase at the present rotor position of the switched reluctance machine,
$i_k$ represents the second reference current for the incoming phase at the present rotor position of the switched reluctance machine; and
σ represents a predetermined value of a weight parameter.

18. The method of claim 15, further comprising:
generating, by the control system, the at least one constraint function based on:

$$0 \leq i_k \leq i_{rated}$$

$$0 \leq i_{k-1} \leq i_{rated},$$

wherein:
$i_{k-1}$ represents the first reference current for the outgoing phase at the present rotor position of the switched reluctance machine,
$i_k$ represents the second reference current for the incoming phase at the present rotor position of the switched reluctance machine; and
$i_{rated}$ represents an allowable peak current for the switched reluctance machine.

19. The method of claim 15, further comprising:
generating, by the control system, the at least one constraint function based on:

$$T_{ref} = T(i_k, \theta_k) + T(i_{k-1}, \theta_{k-1}),$$

wherein:
$T_{ref}$ represents a reference torque for the switched reluctance machine,
$T(i_{k-1}, \theta_{k-1})$ represents a phase torque for the switched reluctance machine in the outgoing phase; and
$T(i_k, \theta_k)$ represents a phase torque of the switched reluctance machine in the incoming phase.

20. The method of claim 15, further comprising:
generating, by the control system, the at least one constraint function based on:

$$\frac{\Delta \lambda(i_k, \theta_k)}{\Delta t} \leq V_{DC} - i_k R$$

$$\frac{\Delta \lambda(i_k, \theta_k)}{\Delta t} \geq -V_{DC} + i_k R$$

$$\frac{\Delta \lambda(i_{k-1}, \theta_{k-1})}{\Delta t} \leq V_{DC} - i_{k-1} R$$

$$\frac{\Delta \lambda(i_{k-1}, \theta_{k-1})}{\Delta t} \geq -V_{DC} + i_{k-1} R$$

wherein:
$V_{DC}$ represents a dc-link voltage supplied to the switched reluctance machine,
R represents a phase resistance,
λ represents a phase flux linkage,
Δt represents the sampling period,
$i_{k-1}$ represents the first reference current for the outgoing phase of the switched reluctance machine,
$i_k$ represents the second reference current for the incoming phase of the switched reluctance machine;
$\theta_{k-1}$ represents a rotor position for the outgoing phase of the switched reluctance machine, and
$\theta_k$ represents a rotor position for the incoming phase of the switched reluctance machine.

* * * * *